(12) United States Patent
Houvener et al.

(10) Patent No.: US 8,730,037 B2
(45) Date of Patent: May 20, 2014

(54) PHYSICAL INTERACTION DEVICE FOR PERSONAL ELECTRONICS AND METHOD FOR USE

(75) Inventors: Robert C. Houvener, Hollis, NH (US); Michele M. Hermsen, Fairfield, CT (US); Tyler N. Doyle, Marblehead, MA (US)

(73) Assignee: Physical Apps, LLC, Hollis, NH (US)

( * ) Notice: Subject to any disclaimer, the term of this patent is extended or adjusted under 35 U.S.C. 154(b) by 269 days.

(21) Appl. No.: 13/348,434

(22) Filed: Jan. 11, 2012

(65) Prior Publication Data

US 2012/0139727 A1 Jun. 7, 2012

Related U.S. Application Data

(60) Provisional application No. 61/468,369, filed on Mar. 28, 2011, provisional application No. 61/538,361, filed on Sep. 23, 2011.

(51) Int. Cl.
*G08B 21/00* (2006.01)

(52) U.S. Cl.
USPC ........... 340/540; 340/517; 340/665; 340/669; 340/691.6; 473/570

(58) Field of Classification Search
USPC .............. 340/540, 500, 517, 573.1, 665, 669, 340/691.1, 691.6, 407.1; 446/46, 47; 473/570, 571
See application file for complete search history.

(56) References Cited

U.S. PATENT DOCUMENTS

| | | |
|---|---|---|
| 4,577,865 A | 3/1986 | Shishido |
| 4,595,200 A | 6/1986 | Shishido |
| 5,288,069 A | 2/1994 | Matsumoto |
| 5,526,326 A * | 6/1996 | Fekete et al. ................... 368/10 |
| 5,761,096 A * | 6/1998 | Zakutin ........................ 702/149 |
| 5,810,685 A | 9/1998 | Willner et al. |
| 5,980,263 A | 11/1999 | Conover |

(Continued)

FOREIGN PATENT DOCUMENTS

| | | |
|---|---|---|
| EP | 1 637 192 A1 | 3/2006 |
| EP | 2 090 346 A1 | 8/2009 |

OTHER PUBLICATIONS

Fisher-Price Laugh & Learn Apptivity Monkey http://mattelapptivity.com/app-toysgames/monkey/ Nov. 29, 2012, 2 pages.

(Continued)

*Primary Examiner* — Toan N Pham
(74) *Attorney, Agent, or Firm* — Choate Hall & Stewart LLP; William R. Haulbrook

(57) ABSTRACT

The present disclosure describes, among other things, a method that may include receiving, at one or more sensors in communication with a mobile computing device positioned within a device receptacle portion of a device, the device receptacle portion being configured to substantially enclose and protect the mobile computing device during physical activity, sensor data. The method may include determining, by a processor of the mobile computing device, motion data regarding a movement of the protective device. The method may include estimating a behavior of a user based in part upon the motion data. The method may include generating a response to the behavior including at least one of graphic, audio, tactile, or video output. The method may include providing, through a wireless communications path, the response to a second device in wireless communication with the mobile computing device.

20 Claims, 17 Drawing Sheets

(56) References Cited

U.S. PATENT DOCUMENTS

| | | |
|---|---|---|
| D426,858 S | 6/2000 | Straus et al. |
| 6,152,863 A | 11/2000 | Nelson et al. |
| D436,381 S | 1/2001 | Podd et al. |
| D439,621 S | 3/2001 | Podd et al. |
| D446,823 S | 8/2001 | Podd et al. |
| 6,273,819 B1 | 8/2001 | Strauss et al. |
| 6,464,602 B1 | 10/2002 | Rottger |
| 6,582,330 B1 * | 6/2003 | Rehkemper et al. .......... 473/570 |
| 6,646,864 B2 | 11/2003 | Richardson et al. |
| 6,773,344 B1 | 8/2004 | Gabai et al. |
| 6,940,432 B1 | 9/2005 | Hall |
| 7,158,376 B2 | 1/2007 | Richardson et al. |
| 7,180,735 B2 | 2/2007 | Thomas et al. |
| D542,855 S | 5/2007 | Lim |
| 7,273,431 B2 * | 9/2007 | DeVall .......................... 473/570 |
| D561,242 S | 2/2008 | Dahl |
| 8,360,904 B2 * | 1/2013 | Oleson et al. ................. 473/570 |
| 2006/0003709 A1 | 1/2006 | Wood |
| 2006/0010588 A1 | 1/2006 | Schuster et al. |
| 2007/0028099 A1 | 2/2007 | Entin et al. |
| 2007/0113306 A1 | 5/2007 | Paci et al. |
| 2008/0132289 A1 | 6/2008 | Wood et al. |
| 2012/0309256 A1 | 12/2012 | Theodore |

OTHER PUBLICATIONS

Mattel Apptivity Play: Yet another way to turn your iPad into a toy http://www.gizmag.com/apptivity-ipad-toys/23995/, Nov. 29, 2012, 4 pages.

Written Opinion for PCT/US12/26469 mailed Jun. 26, 2012.

International Search Report for PCT/US12/26469 mailed Jun. 26, 2012.

"New Innovative Smnart Ball, TheO, launches on Kickstarter", Nov. 19, 2011, XP55029980, Internet.

"Apps and TheO ball gets everyone moving and having fun" Nov. 21, 2011, XP55029957, Internet.

"Clever Catch", American Educational Products, LLC, accessed on Apr. 10, 2012. http://www.amep.com/cat_home_clever.asp (2 pages).

* cited by examiner

PHYSICAL INTERACTION DEVICE FOR PERSONAL ELECTRONICS AND METHOD FOR USE

RELATED APPLICATIONS

The present application claims priority to U.S. Provisional Application No. 61/468,369, entitled "Physical Interaction Enabling Protective Device and Method of Using Same" and filed Mar. 28, 2011, and U.S. Provisional Application No. 61/538,361, entitled "Physical Interaction Enabling Protective Device and Method for Wireless Electronic Personal Equipment" and filed Sep. 23, 2011, the contents of each which are hereby incorporated by reference in their entirety. This application is related to Ser. No. 13/348,433, filed on Jan. 11, 2012, and titled "Physical Interaction Device for Personal Electronics and Method for Use" and hereby incorporated by reference.

BACKGROUND

Personal electronic devices may include smart phones, multi-media players, portable music players, digital cameras, handheld gaming systems, and other devices for communication and entertainment. In some implementations, personal electronic devices may be capable of wirelessly connecting to a network, for example via Wi-Fi™ or a cellular carrier. Personal electronic devices, in some implementations, may include one or more features such as voice recognition, voice based control, motion sensing, location sensing, one or more microphones, one or more speakers, one or more video and/or audio outputs, and input mechanisms such as QWERTY keyboard controls, buttons, track balls, and touch screen control elements.

SUMMARY

In one aspect, the present disclosure describes a method that may include receiving, at one or more sensors in communication with a mobile computing device positioned within a device receptacle portion of a device, the device receptacle portion being configured to substantially enclose and protect the mobile computing device during physical activity, sensor data. The method may include determining, by a processor of the mobile computing device, motion data regarding a movement of the protective device. The method may include estimating a behavior of a user based in part upon the motion data. The method may include generating a response to the behavior including at least one of graphic, audio, tactile, or video output. The method may include providing, through a wireless communications path, the response to a second device in wireless communication with the mobile computing device.

The second device may include a display. The device may include an external portion including a material selected from one or more of open cell foam, closed cell foam, foamed resin, and an inflatable bladder. The device may substantially obscure the mobile computing device.

The device receptacle portion may include one or more convex areas configured to enhance air flow around a portion of the mobile computing device. The one or more convex areas may include a deformable material configured to exert pressure upon the mobile device to secure the mobile device within the device receptacle portion.

In one aspect, the present disclosure describes a method that may include positioning, within a protective enclosure portion of the device, a personal electronic device. The method may include initiating execution of instructions associated with a software application on the personal electronic device within the device. The instructions, when executed, may cause a processor of the personal electronic device to determine, via a set of sensor data collected from one or more sensors in communication with the personal electronic device, movement data, correlate the movement data with an anticipated activity of a user interacting with the physical interaction enabling device, and provide feedback to the user in the form of at least one of graphic, video, and audio output responsive to the anticipated activity.

The method may include configuring a set of parameters associated with the software application. Configuring the set of parameters may include identifying a type of the device. Configuring the set of parameters may include uniquely identifying the device. Configuring the set of parameters may include uniquely identifying the user.

The device may include at least one of the one or more sensors.

Providing feedback may include communicating at least one of graphic, video and audio output to an external output device.

In one aspect, the present disclosure describes a system. The system may include a device having an internal cavity configured to releasably secure a handheld computing device. The system may include a processor of the handheld computing device configured to execute instructions that cause the processor to perform the steps of determining an identification associated with a user of device, collecting sensor data associated with interactions between the user and the device, determining at least one activity parameter of an activity enabled by the device, the activity parameter based in part on the sensor data, and storing data associated with both the identification and the activity parameter to a storage media.

The storage media may be accessible to the handheld computing device via a wireless network in communication with the handheld computing device.

The data may be collected and made accessible to a second device as historic data. The data may be accessible to a second device during execution of the instructions.

The device may include at least one of weight training exercise equipment, combat-training exercise equipment, balance and coordination training exercise equipment, or sports game equipment. The device may include an imaginative play toy.

The steps may further include providing feedback to the user based in part on the activity parameter, the feedback including at least one of audio, graphical, video, and tactile output.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1A:
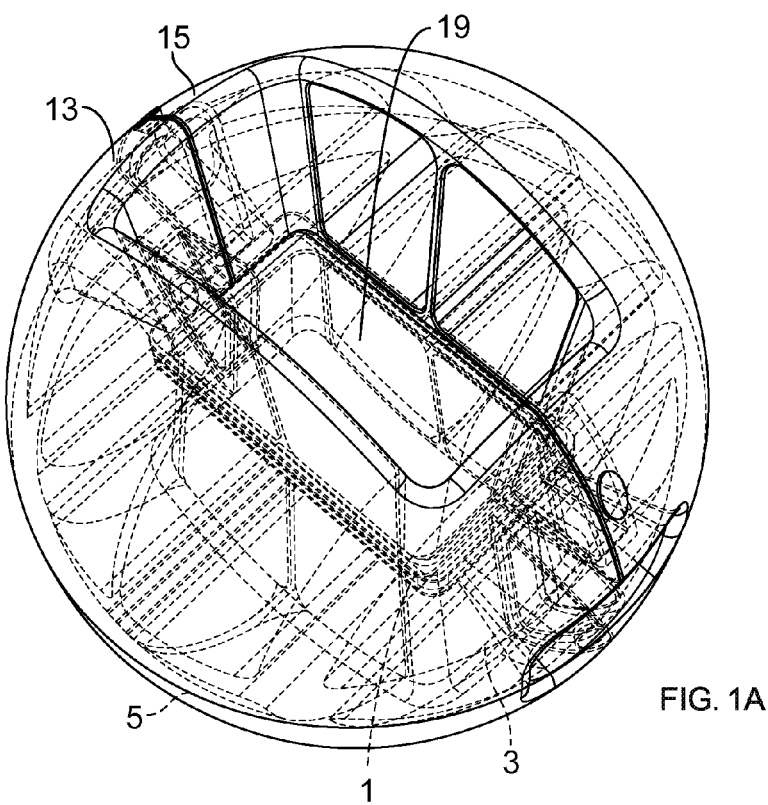
FIGS. 1A and 1B are diagrams of an example ball-shaped protective device.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In some implementations, the present disclosure may be directed to a system and method for interacting with a personal electronic device encased in a protective encasement of a physical interaction-enabling device. A physically protective, light weight and cost-effective covering or encasement for a personal electronic device, in some implementations, may enable use of an off-the-shelf personal electronic device as a game play and learning system. A personal electronic device, in some examples, may include a handheld consumer electronic device, cellular phone, smart phone, multimedia device, personal entertainment device, handheld gaming device, personal digital assistant, or other small computing device.

In some implementations, a personal electronic device may be positioned in a protective enclosure of a protective device to encourage physical interaction with the personal electronic device, without the fear of injury or harm to the personal electronic device itself, to players or surroundings.

The protective device and/or protective encasement, in some implementations, may be constructed of any material capable of absorbing physical shock, thereby protecting the personal electronic device. In some implementations, the protective device may additionally absorb physical shock in a manner that protects users interacting with the protective device as well as the surroundings. In some examples, construction materials of the protective device may include closed cell foams, open cell coated foams, and/or inflatable chambers. A protective chamber region of the protective device, in some implementations, may protect the device from environment damage (e.g., sand, dust, water, snow, etc.), for example by providing a waterproof seal.

In some implementations, a personal electronic device may be encased in a protective enclosure of a protective device to provide protection to the personal electronic device during physical gaming (e.g., where the personal electronic device may be moved about at high velocity, thrown, or shaken). For example, a personal electronic device may be encased in a ball-shaped protective enclosure during a game of media rich "hot potato" where the ball-shaped protective device is tossed from person to person until an indication of game end is presented (e.g., alarm goes off, music stops playing, etc.).

In some implementations, the protective device may include a volume substantially larger than the protective enclosure. For example, the protective device may have a volume at least three times as large as a volume of the personal electronic device. The volume of the protective device, in some implementations, may be substantially hollow, for example allowing the protective device to be light weight or to encourage air flow around a portion of the personal electronic device to aid in cooling of the personal electronic device while encased in the protective enclosure of the protective device.

To engage in interactive play via the personal electronic device encased in the protective device, in some implementations, a user may execute a software application installed in part upon the personal electronic device. In some examples, the software application may come pre-installed upon the personal electronic device, or the user may download the software application from directly connected (e.g., removable memory drive) or networked media storage. In some implementations, the protective device may be sold with one or more software applications or with instructions for accessing one or more software applications designed to enhance the use of the protective device.

In some implementations, a user may visit a web site to shop for and purchase one or more software applications designed for interactive play with a handheld computing device installed within a protective device. For example, via a browsing mechanism available on the personal electronic device or other personal computing device, a user may select one or more software applications to install upon the handheld computing device.

In some implementations, a user may access a software application interface to configure or personalize a software application for use with the protective device. For example, a user may be provided the opportunity to customize an application (e.g., audio settings or custom audio files, video settings or custom video files, voice recognition settings, data collection settings, etc.) through the personal electronic device, or through a web site or online application accessible via another personal computing device. In a particular example, a teacher may select or input a set of trivia questions or spelling words to be used in a physical learning game in a classroom environment. For example, a ball-shaped protective device may be tossed between students, where the student is asked one of a series of questions when the ball is caught. In some implementations, the particular question asked may be based in part upon an orientation of the personal electronic device within the ball-shaped protective device. The questions, in some implementations, may be provided in a randomized order. In some implementations, the questions may be displayed upon a screen area of the personal electronic device which is visible to the student. The question, in some implementations, may be asked audibly, for example through one or more speakers built into the personal electronic device or in communication with the personal electronic device.

In some implementations, a user may be provided the opportunity to build an application configured for interaction with the protective device and to install the application upon the personal electronic device. For example, a user may select and customize existing modules to create a unique software application for interaction with the protective device.

A same software application may be installed upon two or more electronic devices, in some implementations, such that the two or more electronic devices may each be used in interactive play, each of the two or more electronic devices being inserted into a respective protective device. For example, the two or more electronic devices may share data via a wireless network connection during interactive play to provide near real-time interaction between the two devices. In some implementations, the two or more electronic devices may be located in remote locations. For example, a first player in a first geographic location may engage in an interactive game with a second player in a second geographic location.

In some implementations, one or more electronically coupled devices, such as external speakers, microphones, display devices, and remote control devices (e.g., installed interior and/or exterior to the protective enclosure) may be included as part of the media-rich experience provided by the protective device. One or more electronically coupled devices, in some implementations, may be positioned external to the protective device and connected to the personal electronic device and/or the protective device via a wired or wireless connection.

In some implementations, one or more peripheral devices may be installed within the protective device and directly or wirelessly connect to the personal electronic device.

In some implementations, the protective device may include no additional electronics beyond the personal electronic device. For example, an existing personal electronic device may be placed within a protective enclosure of a protective device and a user may access the capabilities of the personal electronic device to engage in a game or learning experience via, for example, a software application executing in part upon the personal electronic device.

In some implementations, a software application running on the personal electronic device may wirelessly communicate with one or more networked devices (e.g., a tablet, laptop, television, digital display, audio speaker, etc.) to enhance and expand the user experience. Further to the example, in some implementations, user data may be stored on the personal electronic device, a networked user device, or in remote network storage (e.g., within an application cloud) for access and use by the user of the personal electronic device or by others (e.g., a coach, doctor, parent, etc.) interested in monitoring data collected via the personal electronic device. Stored data, in some examples, may be accessed in real time or collected and reviewed as historical data.

In some implementations, a personal electronic device may be encased in a protective enclosure of a protective device to enable a user with physical and/or mental limitations to more easily or more safely interact with the personal electronic device. In some implementations, the protective enclosure may be designed for interaction with small children, elderly persons, those with forms of physical ailments such as recoveries from bone or muscle injuries, those with long term physical ailments such as multiple sclerosis etc, and those with forms of dementia.

In some implementations, a patient may utilize a personal electronic device enclosed in a protective enclosure of a protective device to perform rehabilitating work while data regarding progress and/or results of rehabilitative tasks accomplished via the personal electronic device may be recorded and utilized by the user and/or those assisting the user in their rehabilitative activities. In a particular example, a rehabilitative professional may access the data (e.g., via a user interface such as a web page) to review activities that a patient performed. Data collected during interaction with a personal electronic device encased in a protective device, in some implementations, may include detailed statistics recorded by one or more software applications executed in part upon the personal electronic device.

In some implementations, a personal electronic device may be enclosed in a protective enclosure of a protective device to facilitate interaction with the personal electronic device during physical exercise. In some implementations, the protective device may be designed as a piece of exercise equipment, similar to a heavy exercise ball (e.g., medicine ball, kettle), barbell, dumbbell, liquid or gel-weighted shape, or other weight training exercise equipment; a boxing glove, heavy bag, speed bag, standing heavy bag, virtual sparring partner, or other combat-training exercise equipment; a stability disc, wobble board, yoga ball, or other balance and coordination training exercise equipment; or a playground ball, football, basketball, soccer ball, flying disc, baseball bat, or other sports game equipment or recreational equipment. In some implementations, software functioning in part on the personal electronic device may be used to coach a player during physical exercise or track performance during an exercise workout. In some examples, sensors such as an accelerometer, positioning sensor, orientation sensor, global positioning sensor, gyroscope, light sensor, imaging sensor, acoustic sensor, microphone, camera, or other external sensing device may provide data to software functioning in part on the personal electronic device to determine behaviors (e.g., velocity, trajectory, rotational speed) of the protective device or of the user during physical exercise.

In some implementations, a personal electronic device may be enclosed in a protective enclosure of a protective device to facility multi-media rich imaginative play. For example, a personal electronic device may be installed within a protective enclosure designed as a child's toy. One or more sensors within or communicating with the personal electronic device, for example, may provide input to a software application regarding a child's interactions with the toy. In response to sensed interactions, in some examples, the software application may output lights, colors, images, audio, video, vibrations, or other feedback responsive to the child playing with the toy.

While a personal electronic device is encased in a protective device, in some implementations, a user may control the personal electronic device via voice commands. For example, a voice recognition component of the personal electronic device may recognize one or more commands to control the personal electronic device and/or one or more software applications providing a media-rich interactive experience with the protective device via the personal electronic device. Commands, in some examples, may include launching of one or more software applications, configuring one or more software application options, and configuring device options (e.g., volume control, power off, etc.).

In some implementations, a software application executing upon the personal electronic device may determine the identity of a particular player interacting with the personal electronic device. Player identification, in some implementations, may be accomplished via a touch input, such as via one or more button inputs or virtual control inputs such as a virtual keyboard rendered on a screen area of the personal electronic device. In other implementations, the software may utilize one or more biometric identification techniques, such as voice, facial feature, or fingerprint recognition, for example utilizing one or more sensors and/or sensor input applications. For example, biometric identification techniques may be available on the personal electronic device or through software modules accessible via one or more computer networks accessible to the personal electronic device. In some implementations, player identification may be accomplished while the personal electronic device is encased in a protective device. In some implementations, one or more unique identifiers may be mapped to a particular game player such as, in some examples, barcodes or radio-frequency identification (RFID) chips provided in or on a wrist band, card, or other separate identification mechanism. In some implementations, a user may download a unique game player code to the personal electronic device, and the software may access the unique game player code within a memory location of the personal electronic device to identify the game player.

Similarly, in some implementations, the individual protective device may be identified by one or more software applications executing on the personal electronic device. For example, one or more printed bar codes, radio frequency identification chips, or other unique identifiers may be included within or upon the protective device, enabling either a general identification (e.g., round ball versus football) or a unique identification (e.g., individually-purchased item) of the protective device. In some implementations, the personal electronic device may be used to read an identifying marker, for example by using one or more sensors such as a bar code reader, camera, imaging system, or RFID sensor resident to the personal electronic device. The personal electronic device, in some implementations, may utilize that information to customize user experience, for example during game play or other interaction.

In some implementations, recognition of a type of protective device, a uniquely identified protective device, and/or a uniquely identified game player may be used to customize and enhance presentation of one or more games for use with the protective device. In some implementations, unique audio, graphic, or video input may be provided based in part upon identification of the protective device. For example, upon recognition that the protective device was sold with an exterior design of a licensed character, catch phrases of the licensed character, a voice of the licensed character, and/or one or more images or videos of the licensed character may be provided to the game player during interactive play. In some implementations, unique identification of a user may allow the software application to store information (e.g., high score, preferences, historical performance data, etc.) associated with the unique user on the personal electronic device and/or at a remote storage location on a computer network accessible to the personal electronic device.

Figure 1B:
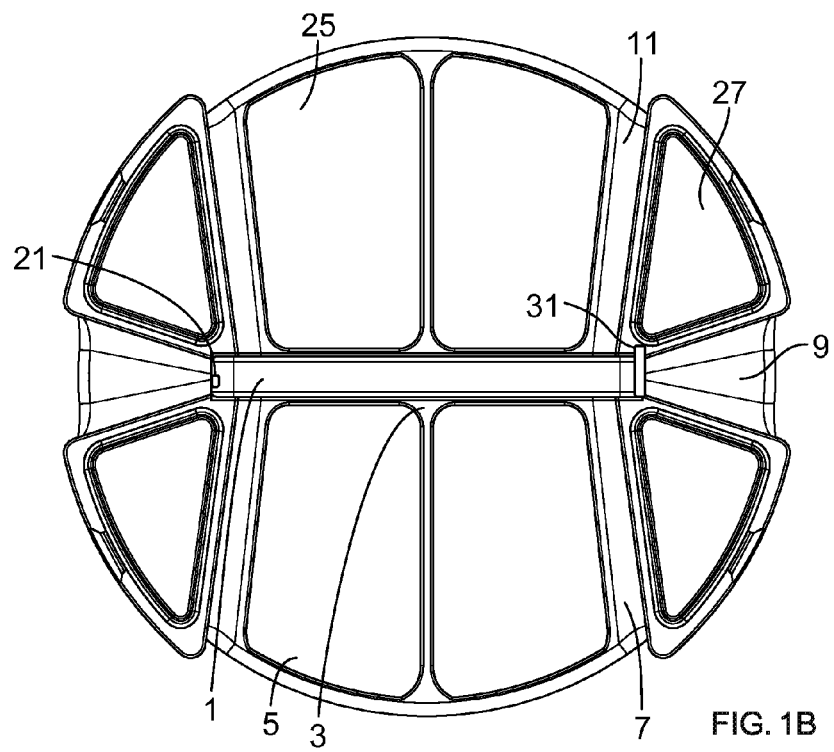

Turning now to FIGS. 1A and 1B, some implementations of a game-enabling physical protection device may include a ball-shaped structure 5 having an internal slot 3 for housing a personal electronic device 1. The ball-shaped structure 5, in some implementations, may be constructed in part using a foam material. As illustrated in FIG. 1A, a cut-away view of the ball-shaped structure 5 may show the personal electronic device 1 with a screen area 19 facing up.

The ball-shaped structure 5, in some implementations, may include a first portion 13 releasably connected to a second portion 15. For example, to place the personal electronic device 1 within the ball-shaped structure 50, the first portion 13 may be at least partially detached from the second portion 15 (e.g., opened at a hinge, fully detached, etc.). In some implementations, for example, the two portions 13 and 15 of the ball-shaped structure 5 may be folded together, pivoting around a hinge (not shown) which may be connected to both the first portion 13 and the second portion 15. Further to the example, when folded together, the first portion 13 and the second portion 15 may form a sphere or ball shape, completely surrounding the personal electronic device 1 and protecting the personal electronic device 1 (e.g., from most impact situations). To protect the personal electronic device 1 from impact, materials utilized in manufacturing the first portion 13 and the second portion 15 may include, in some implementations, a foam material. Furthermore, the foam material, in some implementations, may generally protect users, bystanders and/or other physical items such as furniture etc, from damage or injury due to physical impact with the ball-shaped physical structure 5. In some implementations, the ball-shaped structure 5 may include cavities such as a first cavity 25 and/or a second cavity 27 which may work to reduce the weight of the ball-shaped structure 5, lower the cost of manufacture of the ball-shaped structure 5, and/or provide areas to stow accessories (e.g., input/output devices, storage devices, etc.). For example, one or more audio output devices may be provided within the first cavity 25.

As illustrated in FIG. 1A, the first portion 13 may be connected to the second portion 15 at a seam that aligns substantially with the diameter of the ball-shaped structure 5. This seam, for example, may align length-wise with the center of the screen area 19 of the personal electronic device 1.

Figure 12:
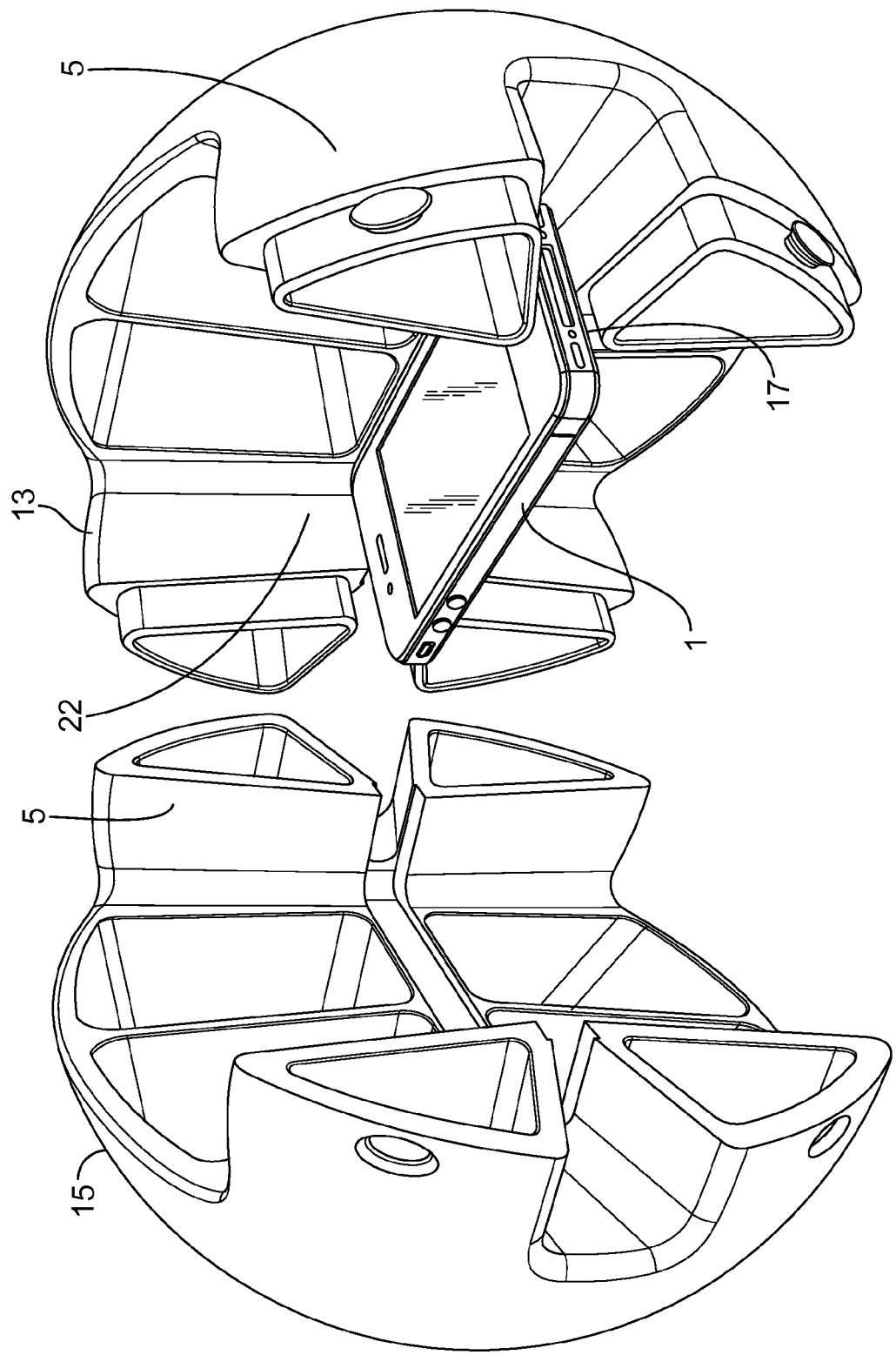
FIG. 12 is an engineering model of an example ball-shaped protective device.

Once the personal electronic device 1 has been placed within the slot 3 of the ball-shaped structure 5, and the first portion 13 has been connected to the second portion 15 (e.g., locking mechanism, static force, etc.) such that the personal electronic device 1 is fully encompassed by an outer diameter of the ball-shaped structure 5, in some implementations a user may interact directly with the personal electronic device 1 via one or more cut-outs in the structure of the ball-shaped structure 5, such as a first cut-out 7 (e.g., substantially aligned with a bottom or screen-opposing portion of the personal electronic device 1), a second cut-out 9 (e.g., substantially aligned with a width-wise edge of the personal electronic device 1), or a third cut-out 11 (e.g., substantially aligned with a screen-confronting portion of the personal electronic device 1). One or more of the cut-outs 7, 9 and 11, in some implementations, may be aligned to allow a user to interact with an audio or visual element of the personal electronic device 1 while the personal electronic device 1 is in the ball-shaped structure 5. Referring now to FIG. 12, in some implementations, the cut-outs 7, 9, and 11 may each be designed to provide access to a particular feature of the personal electronic device 1, such as, but not limited to, one or more speaker(s) 17, a portion of the screen area 19, a microphone, a camera lens, and/or a physical control (e.g., power button, volume adjustment, etc.). In some implementations, the screen area 19 may be substantially visible via an opening 22 (e.g., formed in at least one of the first portion 13 and the second portion 15 of the ball-shaped structure 5) such that players may view a substantial portion of the screen area 19 by looking down through the opening 22. In some implementations, the opening 22 may be designed such that the screen area 19 may be substantially protected from a direct impact. The opening 22, in some implementations, may include a transparent protective material, allowing visual access to the screen area 19 but no physical access.

In some implementations, rather than providing physical access to one or more physical controls of the personal electronic device 1, including, for example, a touch screen style screen area 19, the personal electronic device 1 may be configured with voice recognition capabilities. For example, while the personal electronic device 1 may be encased by the ball-style structure 5, a user may launch one or more software applications, adjust device settings (e.g., increase or decrease volume, power off, etc.), or adjust software application settings (e.g., input number of players for a particular game, select difficulty level for a particular game, etc.) without removing the personal electronic device 1 from the ball-style structure 5 through one or more voice commands.

In order to accommodate various sizes of personal electronic devices 1, in some implementations, adapters may be used to aid in filling excess space in the slot 3, thereby enabling the ball-shaped structure 5 to accommodate a variety of different shapes and sizes of personal electronic devices. In this manner, for example, a single ball-shaped device 1 may accommodate a variety of personal electronic devices owned by a household, and in upgrading from one personal electronic device to another, the owner of the ball-shaped structure 5 may not find it necessary to purchase a new ball-shaped structure to accommodate a new personal electronic device.

Turning to FIG. 1B, in some implementations, one or more bumpers 31 may be utilized at various locations in the slot 3, for example to firmly secure the personal electronic device 1. For example, the bumpers 31 may allow a range of compression to accommodate various sizes of personal electronic devices in the slot 3.

Figure 19:
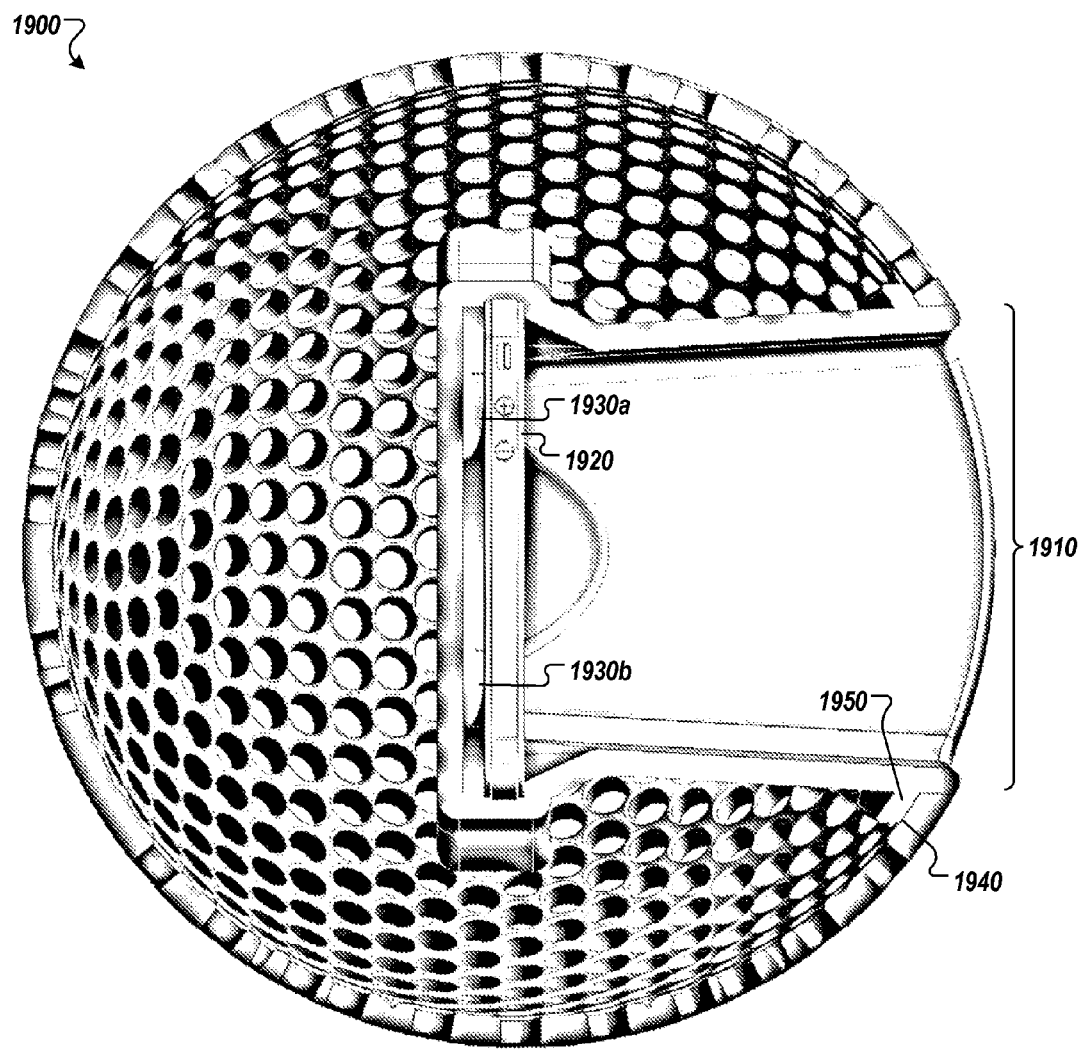
FIG. 19 is a diagram of a third example of a ball-shaped protective device.

Turning now to FIG. 19, in some implementations, a game-enabling physical protection device 1900 may include a pocket 1910 for housing a personal electronic device 1920. The game-enabling physical protection device 1900, in some implementations, may take the form of a substantially hollow sphere. For example, the game-enabling physical protection device 1900 may include an exterior shell, where the pocket 1910 extends inwards from the exterior shell to house the personal electronic device 1920. In some examples, a user may insert the personal electronic device 1920 into the pocket 1910 in a generally screen area up or screen area down orientation. By inserting the personal electronic device 1920 in the game-enabling physical protection device 1900 in a generally screen area up orientation, in some implementations, the user may maintain visual access to the screen area of the personal electronic device 1920 during game play.

In some implementations, rather than having the pocket 1910, a slot in the game-enabling physical protection device 1900 may allow a user to insert the personal electronic device 1920 in a lengthwise or width-wise manner into the game-enabling physical protection device 1900. For example, by inserting the personal electronic device 1920 into a slot (not illustrated) of the game-enabling physical protection device 1900, the screen area of the game-enabling physical protection device 1900 may, in some implementations, be obscured from the user within the game-enabling physical protection device 1900.

In some implementations, the slot or pocket 1910 of the game-enabling physical protection device 1900 may be formed separately from the sphere area, for example including one or more connectors to connect the slot region or pocket 1910 to the wall of the sphere. As illustrated, for example, one or more protrusions 1950 (e.g., tab, ridge, etc.), for example mated to one or more undercut slots (e.g., indentations, slits, fitted openings, etc.) formed in an inside rim region 1940 of the sphere area of the game-enabling physical protection device 1900 may be used to connect the slot region or pocket 1910 to the sphere area of the game-enabling physical protection device 1900. In another particular example, a series of straps may be used to connect the pocket to the sphere. In other implementations, a slot (not illustrated) or pocket may be formed contiguously with the sphere portion of the game-enabling physical protection device 1900. In one example, the inside rim region 1940 of the sphere may surround the protrusion 1950, assisting in locking the slot region or the pocket 1910 into the sphere area of the game-enabling physical protection device 1900. In another example (not illustrated), the slot region or pocket 1910 may be formed of the same material (e.g., molded, carved, hollowed out, machined, etc.) as a connecting region (e.g., the a portion of the sphere area or an interior material, etc.) of the game-enabling physical protection device 1900.

In some implementations, one or more walls of the pocket 1910 or of a slot for the personal electronic device 1920 may include holes or perforations. In some examples, holes or perforations in the walls of the pocket 1910 may aid in air circulation and cooling of the personal electronic device 1920 and/or in enabling sound to carry from one or more speakers of the personal electronic device 1920 to the game player.

Although illustrated as a sphere, in some implementations the game-enabling physical protection device 1900 may be formed in a different shape such as, in some examples, a football, oblong, novelty toy, or piece of exercise equipment. The game-enabling physical protection device 1900, in some implementations, may be formed of a flexible elastomeric material that deforms upon impact. For example, the material of the game-enabling physical protection device 1900 may be selected to absorb forces which may otherwise damage the personal electronic device 1920. In some implementations, the material of the game-enabling physical protection device 1900 may be chosen to include a type of material that returns to an original shape once a force has ceased to be applied (e.g., post-deformation). A game player, in some implementations, may minimally assist in returning the game-enabling physical protection device 1900 from a deformed shape caused by a physical force to an original shape. An example of such a material is a polyurethane foam resin.

As illustrated in the pocket 1910 of the game-enabling physical protection device 1900 of FIG. 19, one or more flexible and/or deformable bumps 1930 may be situated surrounding or abutting the personal electronic device 1920. The deformable bumps 1930 (e.g., convex surfaces), in some implementations, may enhance the ability of the pocket 1910 or a slot to successfully hold personal electronic devices of various dimensions. For example, using the deformable bumps 1930, a wide variety of shapes and sizes personal electronic devices may be maintained within the pocket 1910 without need for separate adapters. In some implementations, to secure the personal electronic device 1920 into the back of the pocket 1910, a user may compress the deformable bumps 1930 during insertion of the personal electronic device 1920, then allow the deformable bumps 1930 to expand, thereby pressing the personal electronic device 1920 firmly against one or more surfaces of the pocket 1910. In some implementations, the deformable bumps 1930 may be positioned at points surrounding the personal electronic device 1920. In some implementations, a combination of convex areas (e.g., deformable bumps 1930) with flat and/or concave surfaces may encourage air flow around the personal electronic device 1920. The combination of convex areas with flat and/or concave surfaces, in some implementations, may enhance the transmission of sound from the personal electronic device 1920.

Figure 14:
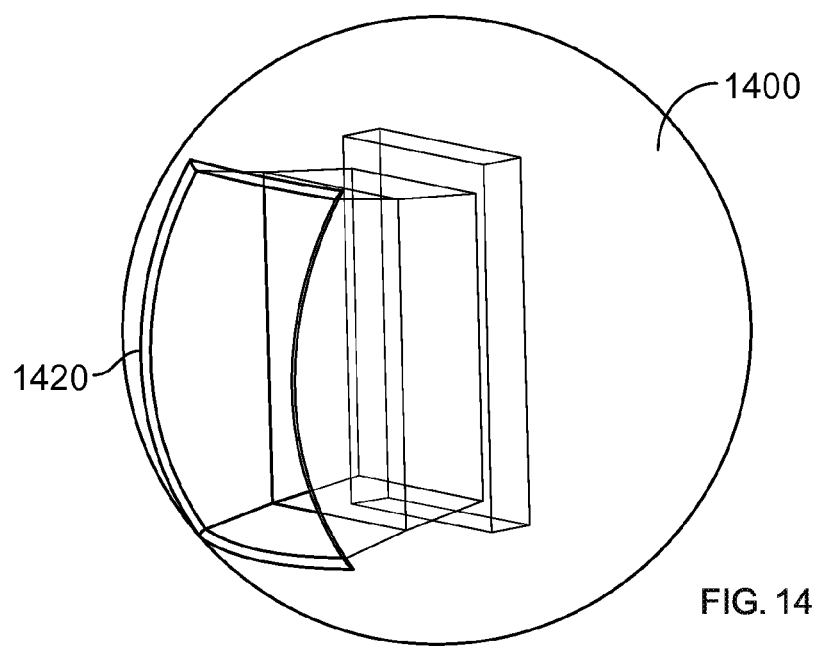
FIG. 14 is a diagram of a second example of a ball-shaped protective device.

In some implementations, a protective device may be fabricated from open cell or skinned open cell foam such as, for example, foams that form a skin-like surface on the outside of the material as it cures during manufacturing of the foam shape. Turning to FIG. 14, a foam protective enclosure 1400 may be provided with a protective recess 1420 to securely encase a personal electronic device. Although the foam protective enclosure 1400, as illustrated, has a globe shape, in other implementations, a protective device may be fabricated from open cell or skinned open cell foam in a variety of shapes and sizes, depending in part upon the intended use of the protective device.

Figure 17:
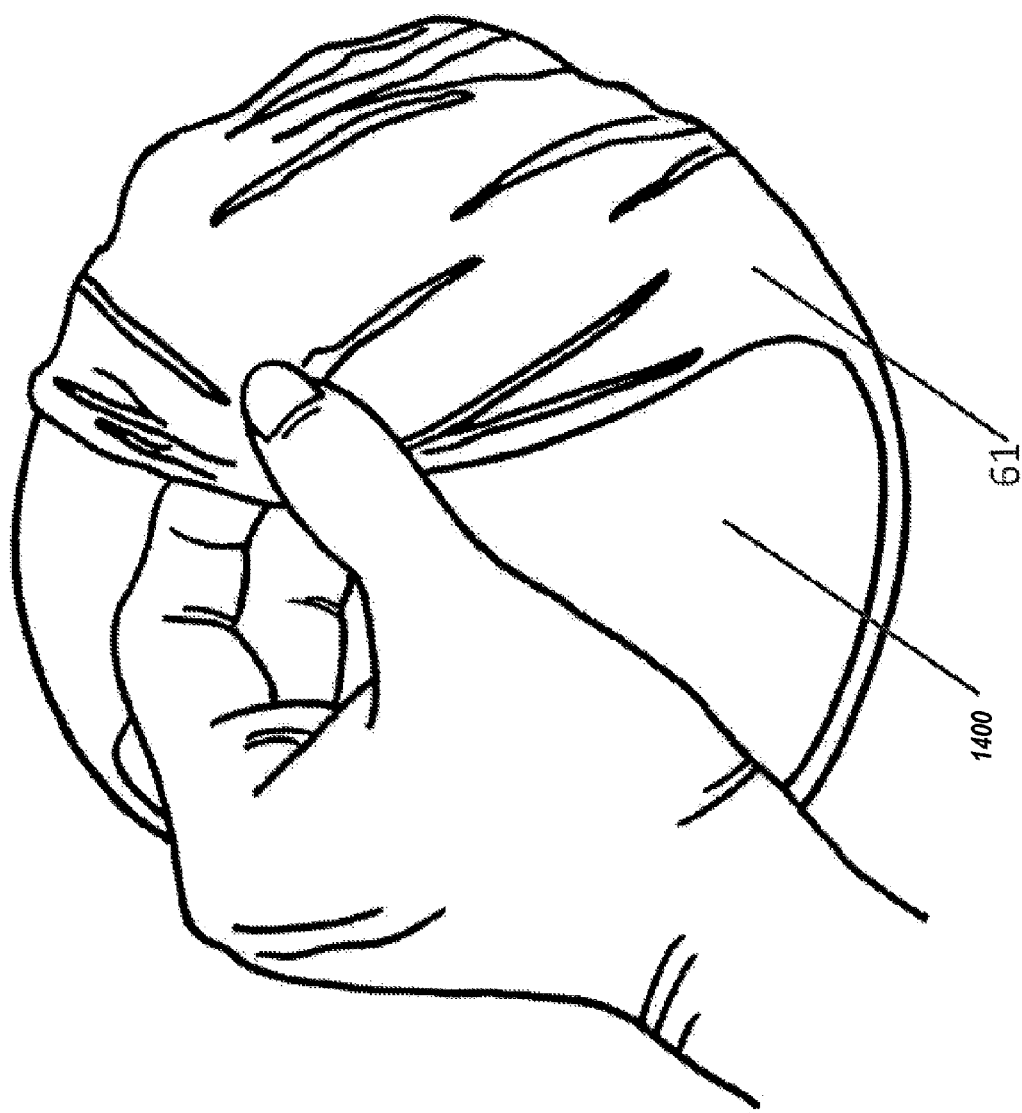
FIG. 17 is a diagram of an example removable cover for a protective device.

In some implementations, a protective device such as the foam protective enclosure 1400 may be surrounded by an external slip cover. As illustrated in FIG. 17, a slip cover 61 may be installed upon the exterior of the foam protective enclosure 1400 to protect, personalize, and/or decorate the foam protective enclosure 1400. In some implementations, the slip cover 61 may be branded or licensed by a corporation to enhance marketing appeal of the foam protective enclosure 1400. The slip cover 61, in some implementations, may be manufactured using a stretchy material such as, in some examples, lycra, nylon, spandex, polyester, cotton jersey, or a combination thereof. In some implementations, the slip cover 61 may include additional protective features, such as water resistance, floatation, and/or enhanced durability. In some examples, protective fabric contents can include Cordura® nylon, polyurethane, neoprene, and foamed neoprene.

Figure 2:
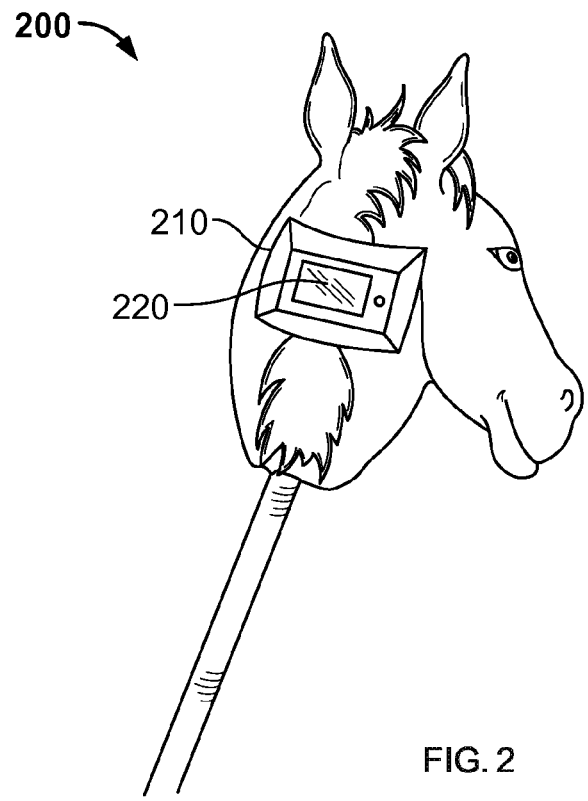
FIG. 2 is a diagram of an example stick horse-shaped protective device.

Although initially described in relation to the ball-shaped structure 5, in other implementations, a protective device including a protective enclosure for encompassing the personal electronic device 1 or other various shapes and sizes of personal electronic devices may take various forms of imaginative play-enabling devices such as inflatable or stuffed children's toys, turning would-be passive stuffed/inflatable toys into highly interactive multi-media rich interactive items. Turning to FIG. 2, a stick horse 200, in some implementations, may include a protective enclosure 210 (e.g., illustrated in the back of the head) designed to hold a personal electronic device 220. In some examples, the stick horse 200 may include a stuffed animal style exterior or may be designed to include an inflatable head. The protective enclosure 210, in some examples, may include foam or an inflatable chamber to buffer the personal electronic device 220 from impact. In some implementations, the protective enclosure 210 may be designed with a child-proof locking mechanism to further protect the personal electronic device 220 from damage due to direct access by a young child.

In some implementations, the personal electronic device 220 may include a software application (e.g., pre-installed or downloaded to the personal electronic device 220 from a wired or wireless network connection) designed to provide a rich multimedia interactive experience for the child playing with the stick horse 200. In some implementations, a software application designed for enhancing play with the stick horse 200 may utilize one or more sensors such as an inertial type sensor (e.g., available in the personal electronic device or in a device communicating with the personal electronic device) to determine movements enacted by the child during play. Further to this example, responsive to data obtained by the one or more sensors, the software application may respond with an appropriate audio output (e.g., whinnying, galloping hooves noise, etc.) and/or video output (e.g., scene movement responsive to "riding" the horse). For example, scenery such as a pasture, beach, track, or other surroundings may be displayed upon a screen area of the personal electronic device 220 or upon a separate display device such as a television, such that when the child bounces the stick horse 200 the scenery output may mimic forward motion. Horse riding noises, in another example, may be provided to one or more audio output devices (e.g., one or more speakers built into the personal electronic device 220, an external speaker in the stick horse 200, a speaker of a display device in communication with the personal electronic device 220, etc.) in response to movements of the personal electronic device 220 installed within the stick horse 200.

In some implementations, a voice recognition module of the software application (e.g., using one or more audio sensors such as a built-in microphone feature of the personal electronic device 220 or an external microphone in communication with the personal electronic device 220) may recognize one or more commands uttered by a child interacting with the stick horse 200. Utilizing voice recognition, in some implementations, the one or more audio sensors may sense voice commands and correlating software and/or hardware mechanisms may interpret one or more voice commands and translate each voice command into an appropriate response. The personal electronic device 220, in this example, may be configured to respond to one or more particular vocal commands (e.g., "go", "back", "neigh", "whinny", "stop", "whoa", etc.), for example, with appropriate audio and/or video output to simulate interaction between the child and the stick horse 200. Although described in relation to the stick horse 200, in other implementations, a variety of imaginative toys, sporting equipment, or other entertainment devices may be configured as protective devices for personal electronic devices, providing similar multi-media rich experiences via sensor input and corresponding output enabled via software application(s) installed on a personal electronic device.

Figure 3:
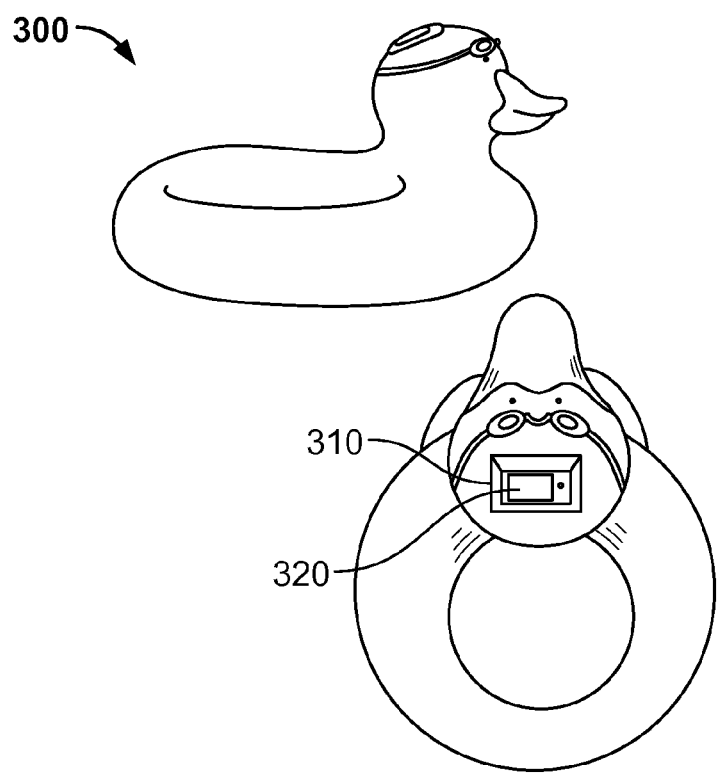
FIGS. 3 and 4 are diagrams of example inflatable protective devices.

Turning to FIG. 3, an inflatable ring floatation device 300, as shown resembling a duck, may in some implementations be utilized on land and in water-based play using a software application running on a consumer electronic device 320 installed in a protective region 310 of the floatation device 300. In some implementations, the protective region 310 may include a waterproof housing including a releasable waterproof seal mechanism. In some examples, the waterproof housing may include one or more waterproof or water resistant flexible materials such as neoprene, rubber, vulcanized rubber, nylon laminate, polyvinyl chloride (PVC), polyurethane, fluoropolymers, silicone elastomer, and/or wax. The waterproof housing, in some implementations, may include a rigid enclosure having a waterproof seal, with a shock-absorbing interior lining of the rigid enclosure including compressible material such as a type of foam or one or more inflatable bladders. In some implementations, the releasable waterproof seal mechanism may include a locking mechanism or other childproofing mechanism to protect the consumer device 320 from damage due to a child removing the consumer electronic device 320 from the protective region 310.

Figure 4:
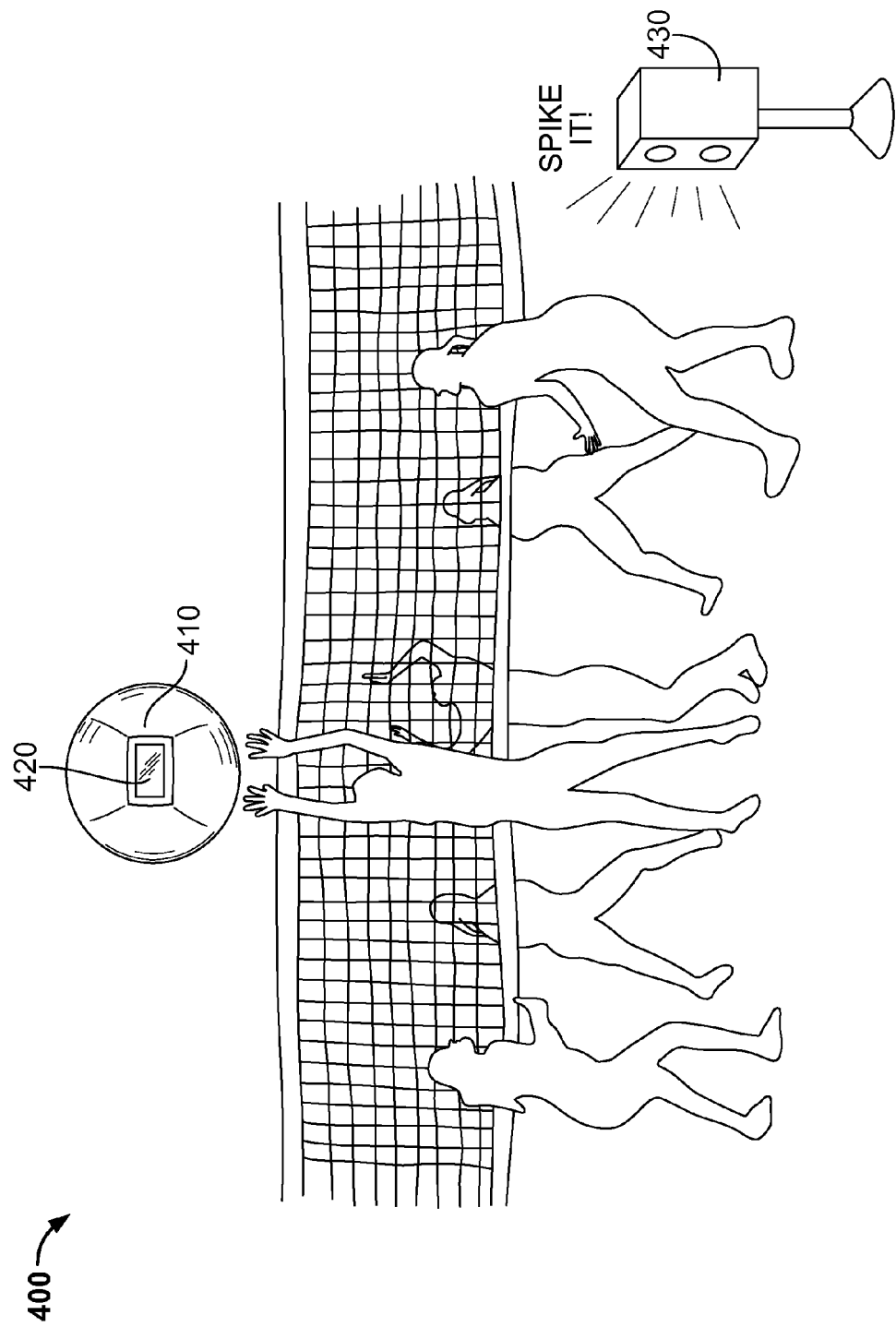

Turning to FIG. 4, an example media-rich sporting activity 400, in some implementations, may include a ball-shaped protective device 410 encasing a handheld electronic device 420 in wireless communication with remote audio equipment 430. The ball-shaped protective device 410, in some examples, may be similar to an inflatable beach ball or a volleyball. Although illustrated as being visible, in some implementations the ball-shaped protective device 410 may completely surround and obscure the handheld electronic device 420. In some implementations, a software application installed upon the handheld electronic device 420 may interact in real-time with the remote audio equipment 430 to engage the players (e.g., during a game of volleyball), for example, with commentary or to relay scoring information. In some implementations, the ball-shaped protective device 410 may include a water tight enclosure configured to protect the handheld electronic device 420 from physical impact and environmental impacts such as sand, water, and snow.

Figure 13:
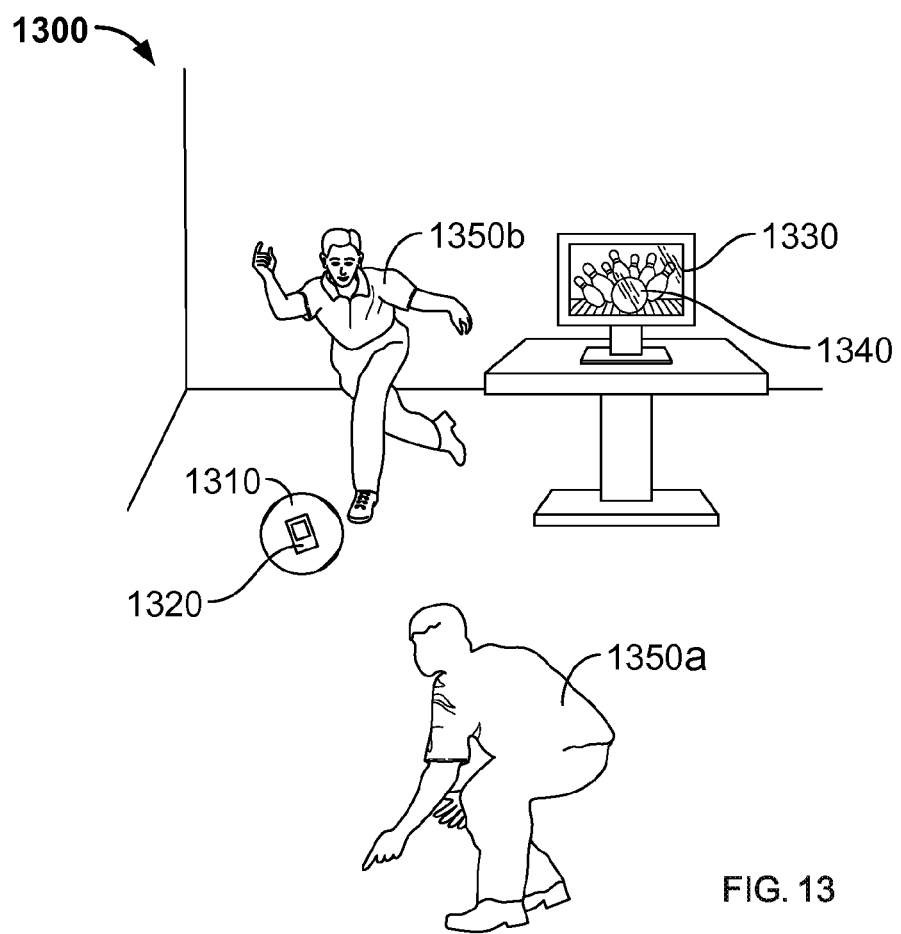
FIG. 13 is an illustration of an example use for an active play toy including a protective encasement.

In some implementations, a ball-shaped protective device, such as but not limited to the ball-shaped structure described in relation to in FIGS. 1A and 1B or the foam protective enclosure 1400 described in relation to FIG. 14, may be used in conjunction with a bowling alley software application. Turning to FIG. 13, a ball-shaped physical interaction-enabling device 1310 may enclose a smart device 1320 executing a bowling application to enable bowling interactive play as illustrated in an activity diagram 1300. The bowling application may include software modules designed to interpret data received by one or more sensors resident within the smart device 1320 and/or in communication with the smart device 1320 to recognize movement from the ball-shaped physical interaction-enabling device 1310. In some implementations, when a software module executing upon the smart device 1320 interprets sensor input indicative of movement related to rolling the ball-shaped physical interaction-enabling device 1310, the smart device 1320 may display movement in a scene on a screen area of the smart device 1320. The smart device 1320, in some implementations, may communicate display information to a remote display 1330, causing the display of movement in a scene 1340 upon the remote display 1330 (e.g., personal computer monitor, LCD display, television, or smart television (STV), etc.). For example, as illustrated, a trajectory of the ball-shaped physical interaction-enabling device 1310 may be interpreted in relation to striking virtual bowling pins (e.g., as illustrated on the remote display 1330). For example, a scene 1340 on the remote display 1330 may graphically illustrate the play action in real time (e.g., in a video mode). In some implementations, coordination between multiple smart devices in multiple ball-shaped physical interaction-enabling devices may enable multiple players 1350 to compete in bowling. Coordination between the multiple ball-shaped physical interaction-enabling devices, in some examples, may be achieved by local or remote wireless communication such as, in some examples, radio frequency (RF) transmissions, Bluetooth® transmissions, cellular transmissions, or Wi-Fi™ transmissions.

In some implementations, various techniques utilizing the sensors internal to the smart device 1320 and/or supplemental sensors upon or within the ball-shaped physical interaction-enabling device 1310 or within the general play area surrounding the ball-shaped physical interaction-enabling device 1310 may be used by a bowling software application executing in part on the smart device 1320, in some examples, to create, maintain and utilize a virtual grid. For example, the virtual grid may track sensor data to estimate, substantially in real-time, a location and attitude of the smart device 1320 and/or the ball-shaped physical interaction-enabling device 1310. Further, in some implementations, a location and general physical attitude of a player 1350a, for example, may be estimated based upon sensor data tracked in the virtual grid. The estimated location and attitude information may be used, in some implementations, by the bowling software application to present substantially accurate feedback to the player 1350a upon the remote display 1330.

Figure 15:
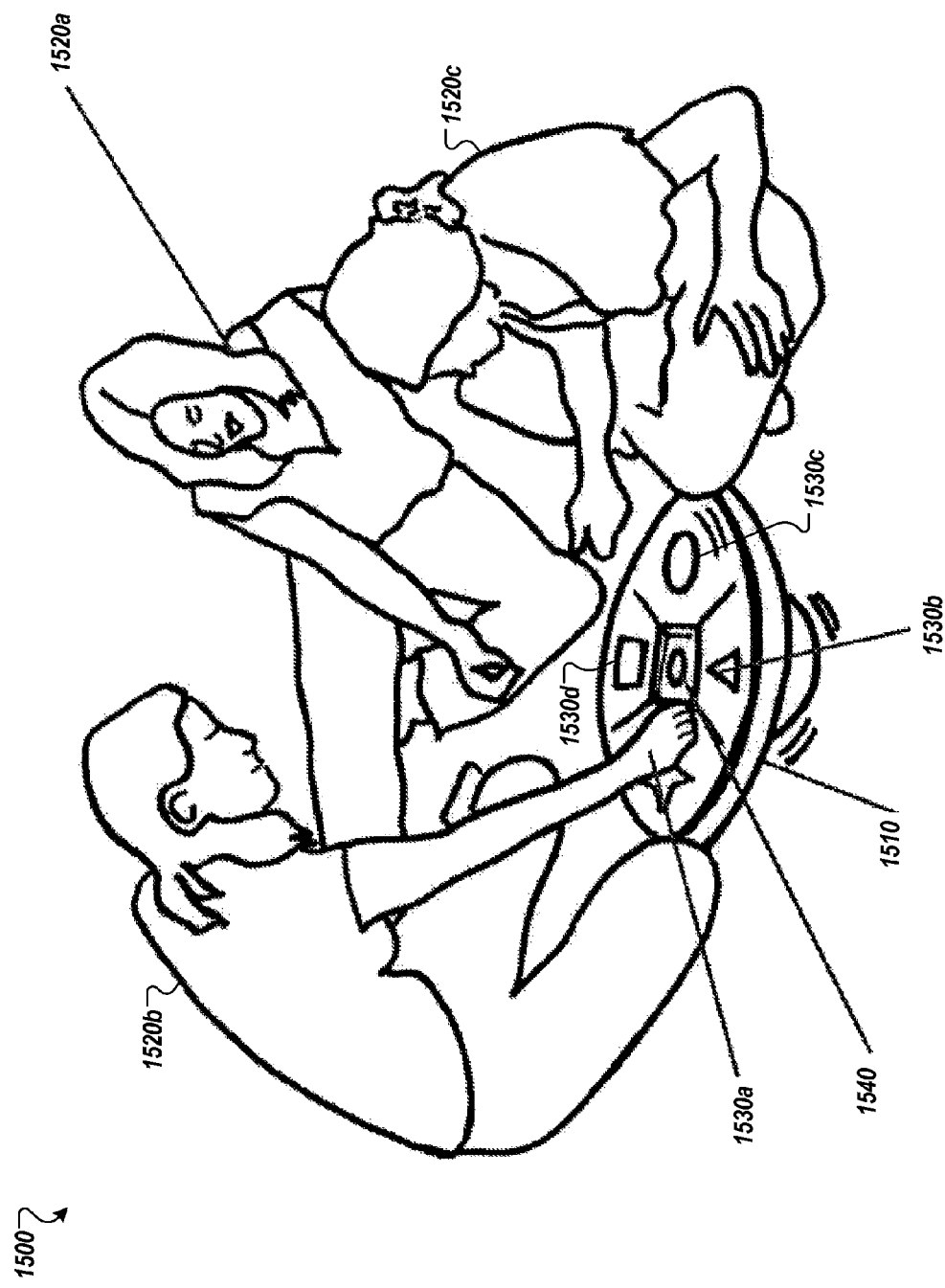
FIG. 15 is a diagram of an example wobble-board including a protective encasement.

Turning to FIG. 15, in some implementations, interactive game play may be enabled through a disc-shaped protective device 1510. As shown in a game playing scene 1500 involving three players 1520, the disc-shaped protective device 1510 may, in some examples, be spun, tilted, tapped, and/or tossed. As illustrated, the disc-shaped protective device 1510 may include a series of symbols 1530 (e.g., "virtual buttons" or contact regions). In some implementations, a slip cover may encase a portion of the disc-shaped protective device 1510, for example creating game-specific surfaces, such as the series of symbols 1530. In some examples, when a player 1520 "presses" a particular region including one of the symbols 1530, the change in attitude of a personal electronic device 1540 may be sensed by one or more sensors built into the personal electronic device 1540 and/or in communication with the personal electronic device 1540. This sensor input, for example, may be as input in the game play scenario. For example, when a player taps a region including one of the symbols 1530, the disc-shaped protective device 1510 may tilt in the direction of the region of the disc-shaped protective device 1510 that was tapped, thus altering the attitude and/or location of the personal electronic device 1540 in a manner that may be identified through data collected via one or more sensors.

Figure 18:
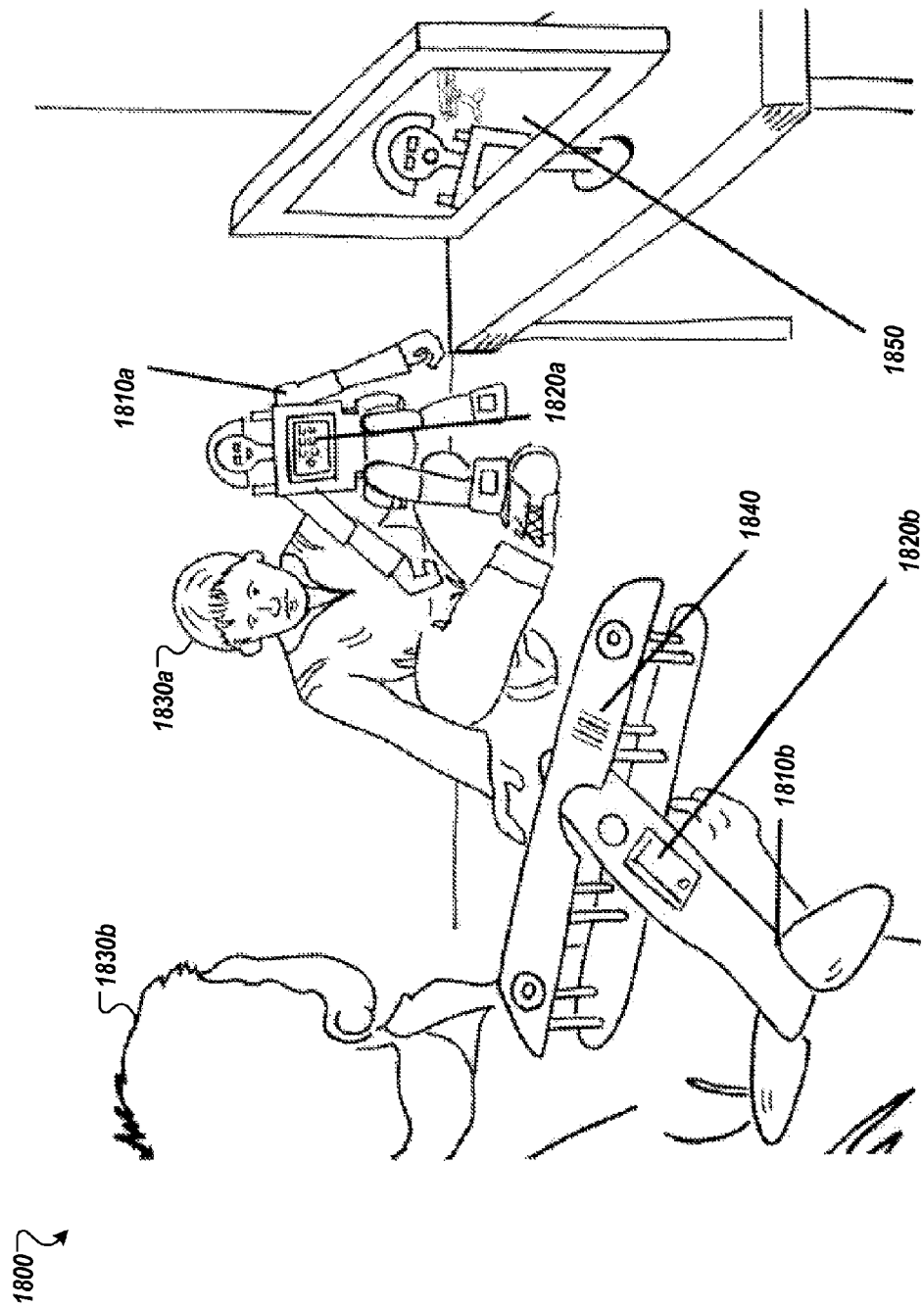
FIG. 18 is an illustration of an example use for imaginative play toys including protective encasements.

Turning now to FIG. 18, an illustration of an interactive play scene 1800 includes novelty protective shapes 1810a, 1810b that may be modeled to resemble detailed objects. In some examples, novelty protective shapes 1810 may include dolls, robots, vehicles, boats, airplanes, animals, and licensed characters. For example, the novelty protective shape 1810a may resemble an action figure, while the novelty protective shape 1810b may resemble a model airplane. Each of the novelty protective shapes 1810, in some implementations, may include a protective holder for a handheld computing device 1820. In some implementations, the handheld computing devices 1820a, 1820b in the novelty protective shapes 1810a, 1810b may each utilize one or more on-board and/or remote sensors to determine behaviors of a user 1830a, 1830b interacting the respective novelty protective shape 1810a, 1810b. In some examples, the motion, velocity, geographic reference, and other characteristics of play with the novelty protective shapes 1810 may be determined by the handheld computing devices 1820a, 1820b in near real-time. In this manner, in some implementations, the handheld computing devices 1820a, 1820b may enable audio and/or visual feedback responsive to sensor inputs. In some implementations, a voice recognition application may be used by one of the handheld computing devices 1820, for example to recognize one or more user commands and respond with appropriate audio and/or visual feedback.

In some implementations, each unique novelty protective shape 1810 may be identified by a bar code 1840 or other unique identification mechanism such as a RFID chip, for example to assist in the game play or to provide a customization experience. In some implementations, the handheld computing device 1820b may be used to read the bar code 1840, for example by using one or more sensors such as a bar code reader, camera, or other imaging system. Similar to various gaming features described in relation to the bowling application of FIG. 13, interactions with the users 1830 and the novelty protective shapes 1810 may be reflected in a video scene upon a remote display 1850. In some implementations, the novelty protective shapes 1810 may take on the behavior of a customized controller in reference to a video game environment.

Figure 16:
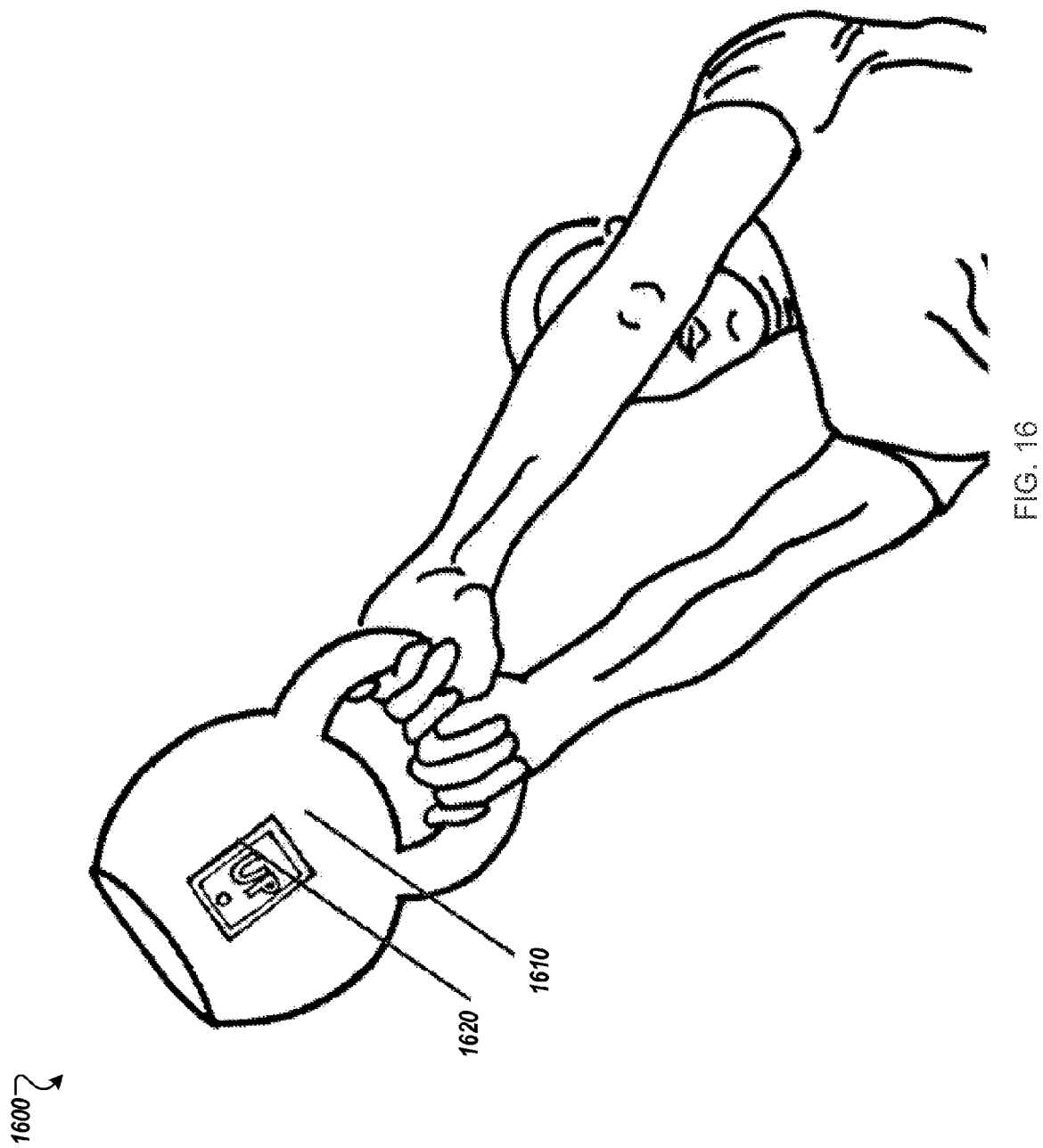
FIG. 16 is a diagram of an example kettle ball including a protective encasement.

Turning to FIG. 16, an athletic device 1610 may be embedded with a mobile device 1620 to enable, for example, an interactive exercise or rehabilitative activity such as is displayed in an exercise scene 1600. As illustrated in the exercise scene 1600, for example, the athletic device 1610 (e.g., a kettlebell style weight), may hold the mobile device 1620 (e.g., within a protective enclosure) which, in turn, may execute an exercise regimen application. In some implementations, the exercise regiment application may determine behaviors of the user through one or more sensor inputs, thereby tracking progress of the user. In some examples, an exercise regimen application may collect information regarding velocity, height, repetitions, and/or timing while a user performs various exercise activities.

In some implementations, an exercise regimen application may provide instructions (e.g., "higher", "slow down", etc.) and/or messages of encouragement (e.g., "just two more lifts", "you can do it", etc.) to the user. Audio prompts, in some implementations, may be provided through one or more separate or external speakers, for example using a wireless headphone device, a speaker built into the athletic device 1610, or communication with an external device such as a personal computer, television, or display monitor. In this manner, for example, the mobile device 1620 may be encased safely within the athletic device 1610 without the need to provide sound-transmission capabilities from a built-in speaker. In some implementations, an exercise regimen application may provide instructions to a user to perform particular strength building and/or rehabilitation activities.

The exercise regimen application, in some implementations, may track progress over time by storing information locally within the mobile device 1620 and/or remotely in a remote storage region. In some implementations, based upon historic data, an exercise regimen application may recommend one or more additional or alternate exercise routines. For example, the exercise regimen application may, upon historic data, suggest that the user step up to a more advanced exercise or a larger number of repetitions.

In some implementations, data regarding the progress of the user may be displayed in real-time. In some examples, a screen area of the mobile device 1620 may be visible to the user, and/or the mobile device may provide input to a separate display device (e.g., a display built into the athletic device 1610 or a remotely located display). In some implementations, audio feedback may be provided to the user in real time (e.g., the device may "count" repetitions, etc.).

In some implementations, data regarding a particular work-out using a software-based exercise regimen on the mobile device 1620 may be transmitted to one or more local or networked computing devices, such as a personal computer, laptop, tablet, or other mobile device or television display. In some implementations, the data may be manipulated via a remote device (e.g., provided to statistical analysis, compared to a group of rehabilitation patients, etc.).

In some implementations, a doctor, physical trainer, or other professional may receive data from the exercise regimen software application regarding the workout of a particular client. In some examples, the data may be transmitted wirelessly to a remote network or remote computer account (e.g., web-based portal, web site, email address, etc.) for review by the professional.

Figure 9:
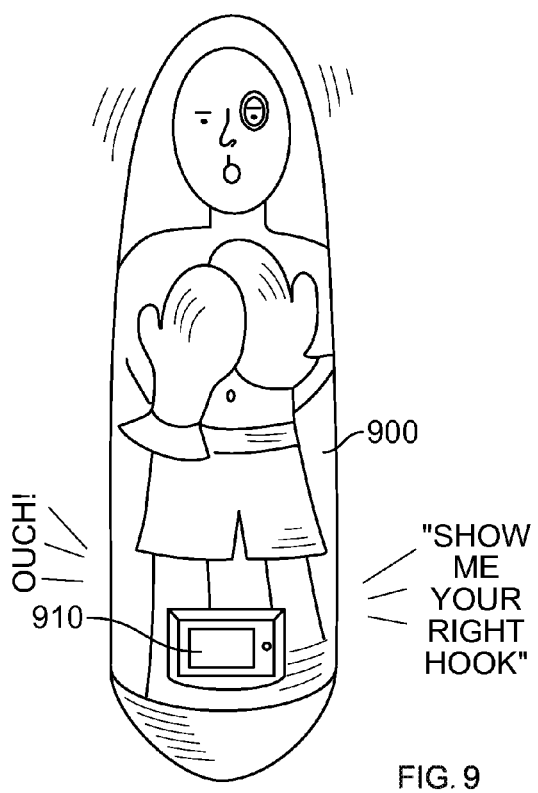
FIG. 9 is a diagram of an example punching bag including a protective encasement.

As illustrated in FIG. 9, in some implementations a combat-training protective device 900 may, for example, be formed in the shape of a punching bag (as shown) or as a speed bag, heavy bag, or stationary opponent bag, in some examples. A wireless electronic device 910, in some implementations, may track and respond to movements or the lack of movement in the combat-training protective device, for example using internal and/or external sensor input. In some implementations, the wireless electronic device 910 may receive feedback from one or more force sensors positioned at various locations on or within the combat-training protective device 900. In some implementations, the wireless electronic device 910 may plug into the combat-training protective device 900, for example through a wired interface within a protective holder. In other implementations, the wireless electronic device 910 may interface wirelessly with one or more wireless sensors of the combat-training protective device 900. In some implementations, the wireless electronic device 910 may communicate with an external speaker, for example built into the combat-training protective device 900 or positioned externally to the combat-training protective device 900, to provide audio feedback during user interaction with the combat-training protective device 900.

In some implementations, the combat-training protective device 900 may be used as a controller for an interactive video game, where strikes made to the combat-training protective device 900 may correlate to activities of a graphical image representing the user or other character within the video game. For example, user behaviors as estimated by software on the wireless electronic device 910 may be translated to behaviors of a graphical representation displayed in a video game scene on a remote display (not pictured).

In some implementations, the combat-training protective device 900 may be used as an exercise or physical therapy tool, similar to the discussion in relation to the athletic device 1610 described in relation to FIG. 16. In some implementations, the combat-training protective device 900 may be used by a trainer in a group exercise or physical therapy session, for example providing data to the trainer regarding the performance of each of a number of participants. In some implementations, the group exercise or physical therapy session may be held as a remote conference. For example, a trainer may be presented to a number of participants via a video session, and the participants may participate in a work out guided by or managed by the trainer.

Figure 6A:
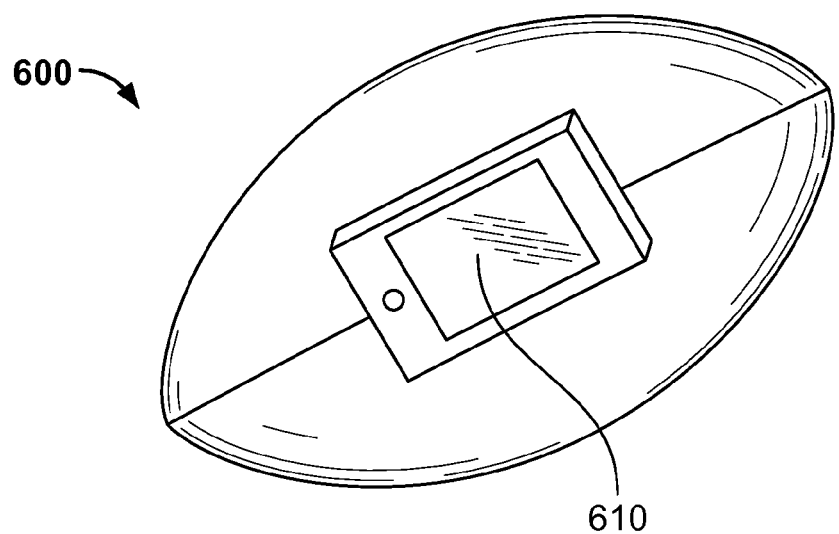
FIGS. 6A and 6B illustrate diagrams of an example football-shaped protective device.
Figure 6B:
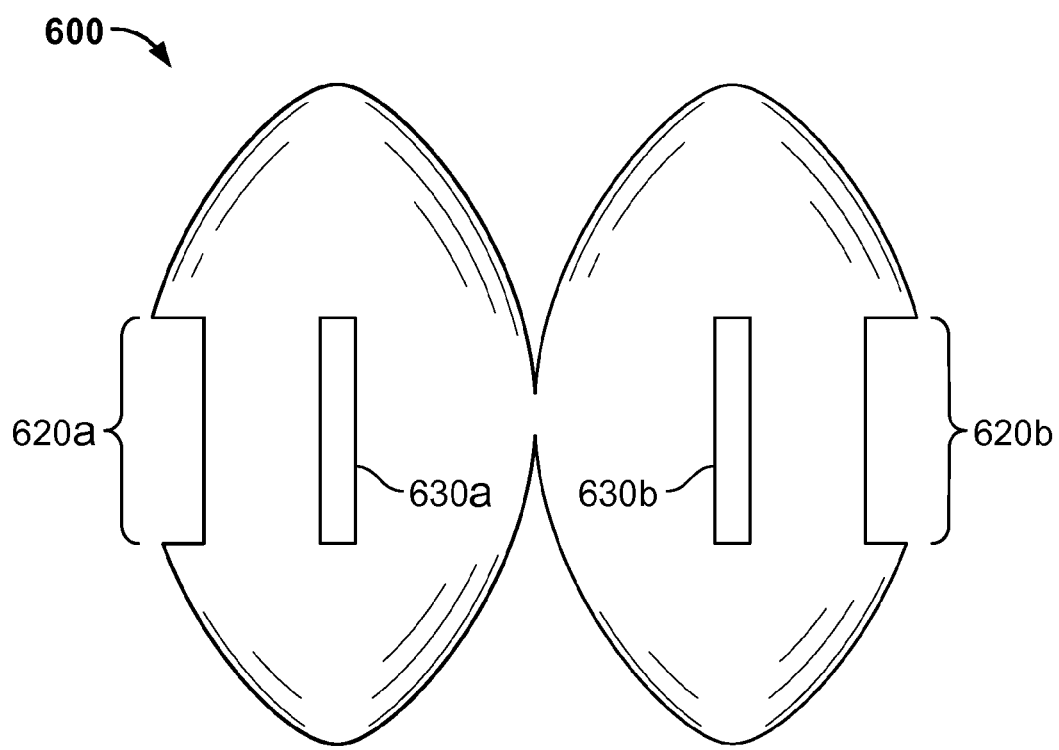

In some implementations, in addition to the basic data collection from sensors in communication with a personal electronic device, complex software algorithms such as, for example, signal processing may be performed on sensor data. The complex software algorithms, in some examples, may be executed on the personal electronic device and/or at one or more remote computing devices accessible to the personal electronic device (e.g., through a wired or wireless network). Turning to FIGS. 6A and 6B, in some implementations a football-shaped protection device 600 may be utilized by school or professional football or rugby training programs, for example to measure the performance of player practicing with the football-shaped protection device 600. The football-shaped protection device 600, in some implementations, may be designed to prevent damage to a personal electronic device 610 encased in the football-shaped protection device 600. For example, as illustrated in FIG. 6B, in some implementations the football-shaped protection device 600 may include two halves that connect together to enclose the personal electronic device 610. For example, the personal electronic device may nestle within a slot area 630 of the football-shaped protection device 600. In some implementations, a cutout area 620 may provide a user with visual access to a screen area of the personal electronic device 610. In other implementations, the football-shaped protection device 600 may wholly encompass the personal electronic device 610, for example to provide a higher level of protection to the personal electronic device 610 during rough play. In order to be a useful training tool to youth or professional sports teams, in some implementations the football-shaped protection device 600 may be designed to feel like a standard football, for example with a substantially similar weight and an exterior fabricated with a material typical of traditional American footballs. In some implementations, the football-shaped protection device 600 may be designed of lightweight materials, for example to provide protection to the players and their surroundings (e.g., for use in a home environment or with small children).

Application software executed upon the personal electronic device 610, as it is seated within the football-shaped protection device 600, may utilize sensor data, in some implementations, to measure the change in forces that the personal electronic device 610 experiences. Further to this example, the application software or software algorithms accessible to the personal electronic device 610 (e.g., via a network interface) may be used to calculate motion data regarding the football-shaped protection device 600 during play (e.g., throwing, kicking, etc.). One or more physics based algorithms, for example manipulating accelerometer and/or other data, may be used to estimate motion vectors of the personal electronic device 610 within the football-shaped protection device 600. In some implementations, sensor data exterior to the football-shaped protection device 600 may be used to provide feedback or reference information to the software algorithms executing up on the personal electronic device 610. For example, one or more players may carry electronic identification mechanisms (e.g., RFID tag, Bluetooth® transponder, etc). In this manner, the software algorithms may estimate positions of one or more players in relation to the football-shaped protection device 600. Similarly, one or more features of the playing area, such as a goal post or line marker, may include electronic identification mechanisms such that software algorithms executing upon the personal electronic device 610 may determine position information in relation to features of the playing field. Although described in relation to football, similar techniques may be employed to a variety of sports including, but not limited to, basketball, soccer, volleyball, or water polo.

Figure 7:
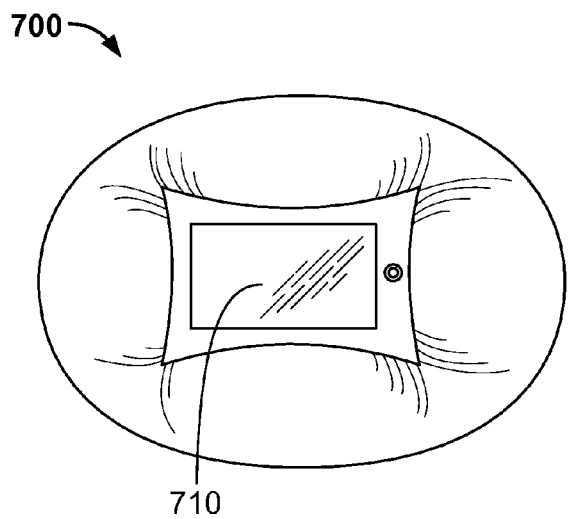
FIG. 7 is a diagram of an example oblong-shaped protective device.

Turning to FIG. 7, in some implementations, an oblong protective device 700 may be used as a tool for enabling those who have limitations to interact with a mobile device 710. In some examples, a small child, an elderly person or a person with limited dexterity may find it beneficial to interact with the oblong protective device 700. In some implementations, the oblong protective device 700 may further be designed to protect a caregiver. For example, materials of the oblong protective device 700 may protect the device from damage upon event of the oblong protective device 700 being thrown, stomped, or struck against another object. Similarly, the oblong protective device, in some implementations, may protect others in the vicinity (e.g., from harm due to having the oblong protective device 700 thrown at them).

In some implementations, the oblong protective device 700 may be used as a tool to train or interact with animals via the mobile device 710. In some examples, a monkey may be trained to manipulate information upon the mobile device 710 using the oblong protective device 700. Similarly, a pet cat or dog may be entertained with audio and/or video information provided by software executing on the mobile device 710 while it is encased in the oblong protective device 700.

Figure 8:
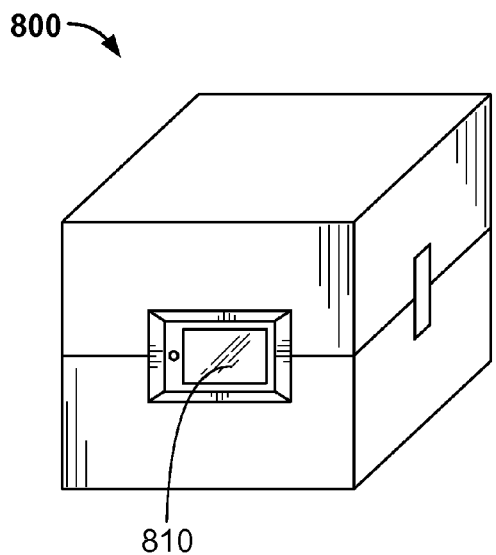
FIG. 8 is a diagram of an example block-shaped protective device.

Turning to FIG. 8, in some implementations, a handheld electronic device 810 may be encased in a block-shaped protective device 800, for example shaped as a rectangular block or a cube. In some examples, the block-shaped protective device 800 may enable activities such as dice-based games, or rich media games involving building blocks. In a particular example involving applications designed for dice-based games, one or more software algorithms running via the handheld electronic device 810 while the handheld electronic device 810 is set in the block-shaped protective device 800 may determine (e.g., via sensor data) which face of the die is facing up. The face-positioning information, for example, may be provided to a visual display as input to a video-based game involving one or more die. For example, in some implementations sensor data in a secondary die may be fed to the handheld electronic device 810 in the main die, such that the handheld electronic device 810 may determine the orientation of both of the dice.

Figure 10:
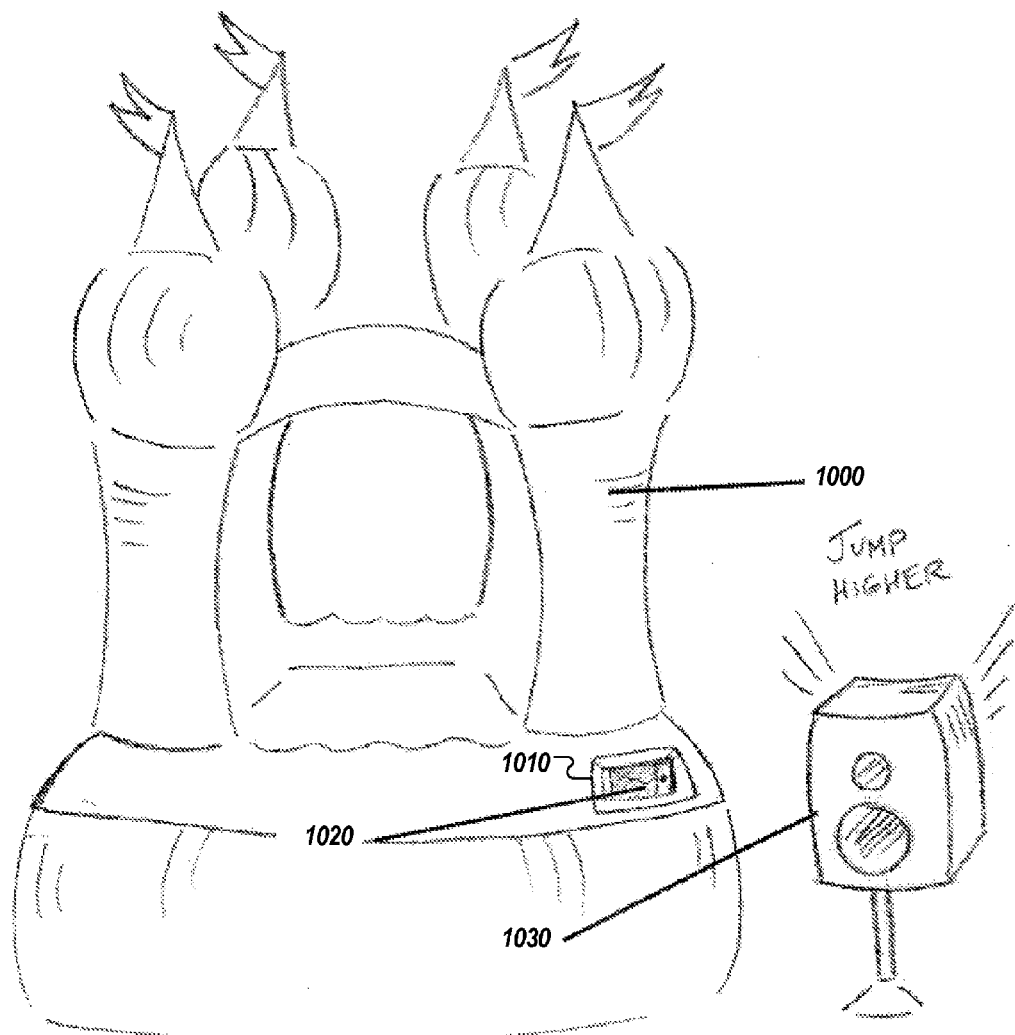
FIG. 10 is a diagram of an example inflatable trampoline including a protective encasement.

Although mainly described in relation to individual interaction, in some implementations a protective device may be incorporated in a protective device that may be interacted with by two or more users simultaneously. For example, as shown in FIG. 10, an inflatable trampoline device 1000 (e.g., "bouncy house") may include a protective enclosure 1010 removably housing a personal electronic device 1020. In some implementations, a software application executing on the personal electronic device 1020 may communicate in real-time with local audio and/or video equipment 1030 during a game session with children in the inflatable trampoline device 1000. For example, the personal electronic device 1020 may play music and/or instructions for the children (e.g., instructions on playing a particular jumping game, "thirty second warning" for end of play period, etc.). In another example, the personal electronic device 1020 may coordinate a light and/or video show to music by communicating with one or more visual inputs built into the inflatable trampoline device 1000 and/or located exterior to the inflatable trampoline device 1000. In some implementations, the personal electronic device 1020 may receive input from a variety of sensors within the inflatable trampoline device 1000, including, in some examples, an air pressure monitor or a decibel level monitor. In some implementations, the personal electronic device 1020 may plug into, and receive power from, the inflatable trampoline device 1000. For example, through a wired connection or a docking port within the protective enclosure 1010, the personal electronic device 1020 may receive power from a power source connected to the inflatable trampoline device 1000. In some implementations, the personal electronic device 1020 may provide power to one or more outputs or sensor elements built into the inflatable trampoline device 1000, for example through a wired connection or a docking port within the protective enclosure 1010. In a particular example, the personal electronic device 1020 may power and control a light display feature of the inflatable trampoline device 1000.

Figure 11:
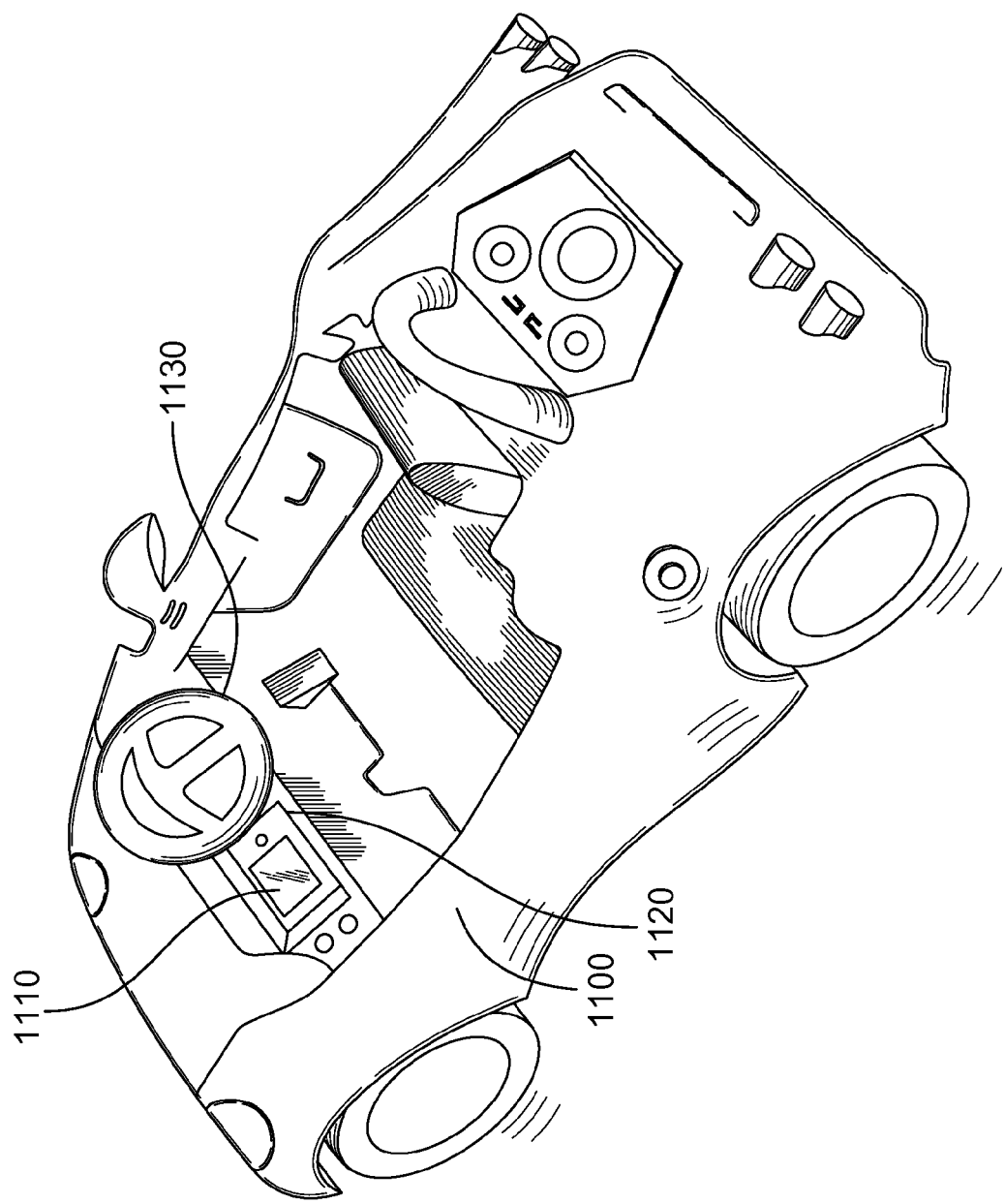
FIG. 11 is a diagram of an example toy car including a protective encasement.

Turning to FIG. 11, in some implementations a smart device 1110 may be temporarily incorporated into in a car-shaped device 1100 including a protective enclosure 1120. In some implementations, the car-shaped device 1100 may be inflatable, made in part of plush stuffed animal materials, or shaped of foam. In some implementations, the car-shaped device 1100 may include a sturdy frame or molded structure and functional wheel base for outdoor use, for example as a form of a push car, pedal car, or battery operated electric car. During play, in some implementations, the smart device 1110 may respond to interactions of a child with the car-shaped device 1100, for example based in part upon sensor data collected by the smart device 1110. In a particular example, the smart device 1110 may sense a change of direction (e.g., of the car-shaped device 1100 or a steering wheel 1130 of the car-shaped device 1100) and display a corresponding change in direction in a graphic representation of the car traveling in a video scene as presented on a display (e.g., a screen area of the smart device 1110 or a remote display device in communication with the smart device 1110).

In some implementations, the smart device 1110 may provide one or more vehicle noises or road noises (e.g., tire squealing, horn honking, ignition turning, engine revving) during play with the car-shaped device 1100. In some implementations involving a car for outdoor use, the smart device 1110 may track the location of the car-shaped device 1100. For example, the smart device 1110, in some implementations, may warn a child who has exceeded a boundary (e.g., left the driveway or yard, crossed a particular street, etc.) or prevent a child from continuing on a particular course (e.g., cut the battery, lock the wheels, etc.).

Figure 5:
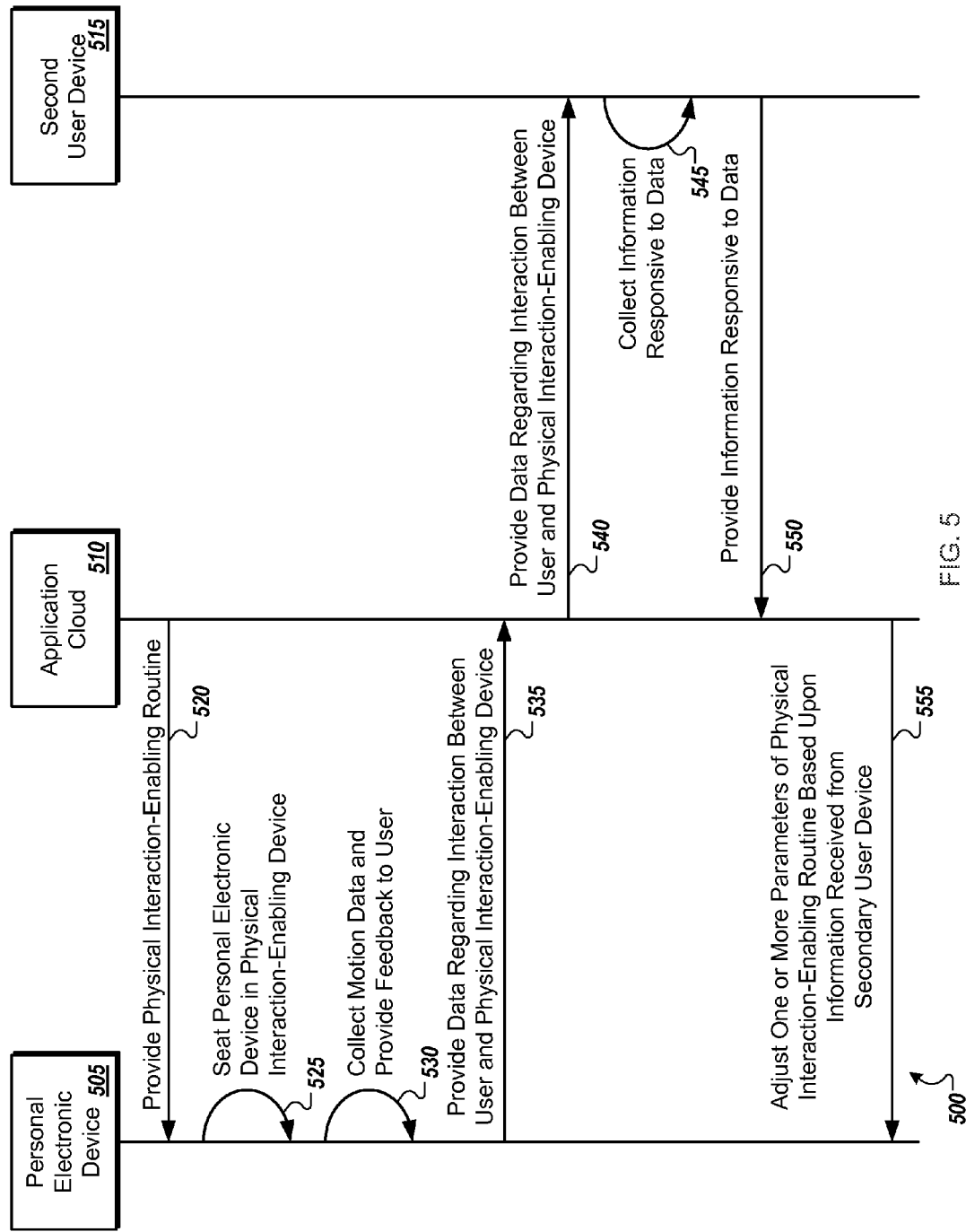
FIG. 5 is a swim diagram illustrating an example method for using a personal electronic device encased in a protective device.

Turning now to FIG. 5, a swim lane diagram 500 details example interactions, provided for in some implementations, between a personal electronic device 505, an application cloud 510, and a second user device 515. The method illustrated by the swim lane diagram 500, in some implementations, may be used to monitor the activities of a user of a physical interaction-enabling device (e.g., if used by a rehabilitation patient, trainee, or student, etc.) or to engage in interactive play between two users, each for example using a respective physical interaction-enabling device.

The method, in some implementations, may begin with providing (520) a physical interaction-enabling routine to the personal electronic device 505. In some implementations, a user may log into a web site or another variety of online application store to purchase a software routine for download to the personal electronic device 505. In other implementations, the personal electronic device 505 may be sold with a copy of the physical interaction-enabling routine. In some implementations, the physical interaction-enabling routine may include device-resident software algorithms and one or more cloud-resident software algorithms that may be executed in tandem (e.g. via a network communications path). The physical interaction-enabling routine, in some implementations, may be specific to a style of physical interaction-enabling device. In some examples, the physical interaction-enabling routine may be formulated to function with an athletic equipment-style device, a imaginative play toy device, an outdoor activity device, or another device capable of enabling physical rich media-enhanced physical activity by accepting the personal electronic device 505 within a protective enclosure portion.

In some implementations, the personal electronic device may be seated (525) in a physical interaction-enabling device. As detailed above, the personal electronic device 505 may be removably inserted within a physical interaction-enabling device including a protective enclosure designed to hold and protect the personal electronic device. In some implementations, the protective enclosure may be designed to house a range of shapes and sizes of personal electronic devices. To accommodate various shapes and sizes of personal electronic devices, in some implementations the physical interaction-enabling device may be sold with a set of bumpers, spacers, or other adjustment equipment to accept differing shapes and sizes of personal electronic devices. In some examples, personal electronic devices may include a variety of cellular phones, smart phones, tablets, personal digital assistant devices, or other handheld or mobile computing devices such as personal gaming systems or multimedia players.

In some implementations, motion data may be collected (530) by the personal electronic device 505, and the personal electronic device 505 may provide feedback to the user responsive to the motion data. In some implementations, the personal electronic device 505 may collect motion data via one or more built-in sensors, such as, in some examples, an accelerometer, positioning sensor, orientation sensor, global positioning sensor, gyroscope, light sensor, imaging sensor, acoustic sensor, microphone, or camera. The personal electronic device 505, in some implementations, may be in wired or wireless communication with one or more external sensors, such as sensors built into the physical interaction-enabling device or sensors external to the physical interaction-enabling device.

Responsive to the collected motion data, in some implementations, the personal electronic device 505 may provide feedback to the user. In some implementations, the feedback may include audio, video, graphic, or tactile output presented to the user, for example through one or more devices built into the personal electronic device 505 (e.g., one or more lights (e.g., LED, etc.), speakers, a display screen area, etc.) or devices in communication with the personal electronic device 505 in a wired or wireless fashion (e.g., lights, a display area, or speakers built into the physical interaction-enabling device or external multimedia outputs such as, in some examples, a personal computer, television, display monitor, speaker system, stereo system, tablet computer, or laptop computing device).

In some implementations, the personal electronic device 505 may provide (535) data regarding interaction between the user and the physical interaction-enabling device to the application cloud 510. In some implementations, collected data may be uploaded and stored to the application cloud 510 as historic data. In some implementations for example involving the circumstance of an exercise program-enabling routine or a physical rehabilitation program-enabling routine, data uploaded may be stored and collected to provide, in some examples, statistical analysis information, a progress timeline, or a comparison with data collected during other sessions of interaction with the physical interaction-enabling device. The provided data, in some implementations, may be used for interactions with other players in the event of a multi-player style of game performed using the physical interaction-enabling device. For example, data collected from the personal electronic device 505 may be used to generate information for presentation to the second user device 515.

In some implementations, the application cloud 510 may provide (540) data regarding interactions between the user and the physical interaction-enabling device to the second user device 515. Although illustrated as a download, in some implementations the second user device 515 may poll or request data from the application cloud 510. Either way, data collected via the personal electronic device 505, in some implementations, may be manipulated into a set of data presented to the second user device 515. In some implementations, the second user device 515 may take the form of a computing device receiving information through a web site or other web portal regarding an ongoing rehabilitation or training routine being performed by the user of the personal electronic device 505. For example, the user at the second user device 515 may, in some implementations, be a doctor, personal trainer, or other professional working with the user of the personal electronic device 505 in a physical activity program involving the physical interaction-enabling device. In some implementations, the user at the second user device 515 may be the user of the personal electronic device 505. In some examples, a user may log into a web portal, access a web site, or launch a cloud-based application to review data collected during interaction with the physical interaction-enabling device while executing the physical interaction-enabling routine. The user, in some implementations, may review performance or adjust settings of the physical interaction-enabling routine using the second user device 515.

In some implementations, the second user device 515 may collect (545) information responsive to the data received. In some implementations, data collected may be indicative of interactions the second user has with the second user device 515 via a second physical interaction-enabling device (e.g., during an interactive gaming scenario). For example, during interactive game play, data may be provided from the personal electronic device 505 to the second user device 515 and vice-versa in near real-time to provide information necessary to virtual interaction. In some implementations, for example if two users are in the same room or same building, rather than passing data via the application cloud 510, the personal electronic device 505 and the second user device 515 may share data directly (e.g., via Bluetooth®, RF, Wi-Fi™, or other short range wireless messaging capability). In some implementations, even if the personal electronic device 505 and the second user device 515 may share certain data in a more direct manner, a portion of user data may be provided to the application cloud 510 (e.g., on a periodic basis, at the end of an interactive gaming session, etc.), for example for statistical collection purposes.

In other implementations, a user (e.g., the user of the personal electronic device 505, or another user such as, in some examples, a doctor, personal trainer, or parent) may adjust parameters associated with the physical interaction-enabling routine based in part upon reviewing data provided in response to the user's interactions with the physical interaction-enabling device. In some examples, a difficulty level of exercise regimen may be increased, a graphical user interface parameter may be adjusted (e.g., different character portrayal, language, character's speech accent, encouragement message setting, etc.), or additional features may be enabled (e.g., add the option of one or more additional rehabilitation exercises).

In some implementations, the second user device 515 may provide (550) information responsive to the data to the application cloud 510. In some examples, setting modifications, additional features, enhanced abilities, or user data regarding the second user device 515 may be uploaded to the application cloud 510, e.g. in a manner similar to that detailed above.

In some implementations, the application cloud 510 may provide information to the personal electronic device 505 responsive to information received from the second user device 515. The information provided to the personal electronic device 505, in some implementations, may be used to adjust (555) one or more parameters of the physical interaction-enabling routine. In some implementations, the information supplied may be used to enable features, adjust settings, or provide output related to the activities of a second user at the second user device 515.

In some implementations, more or fewer actions may take place between the personal electronic device 505, the application cloud 510, and the second user device 515. Furthermore, one or more of the actions described in relation to the swim lane diagram 500 may be executed in a different order than that which is described.

Figure 20:
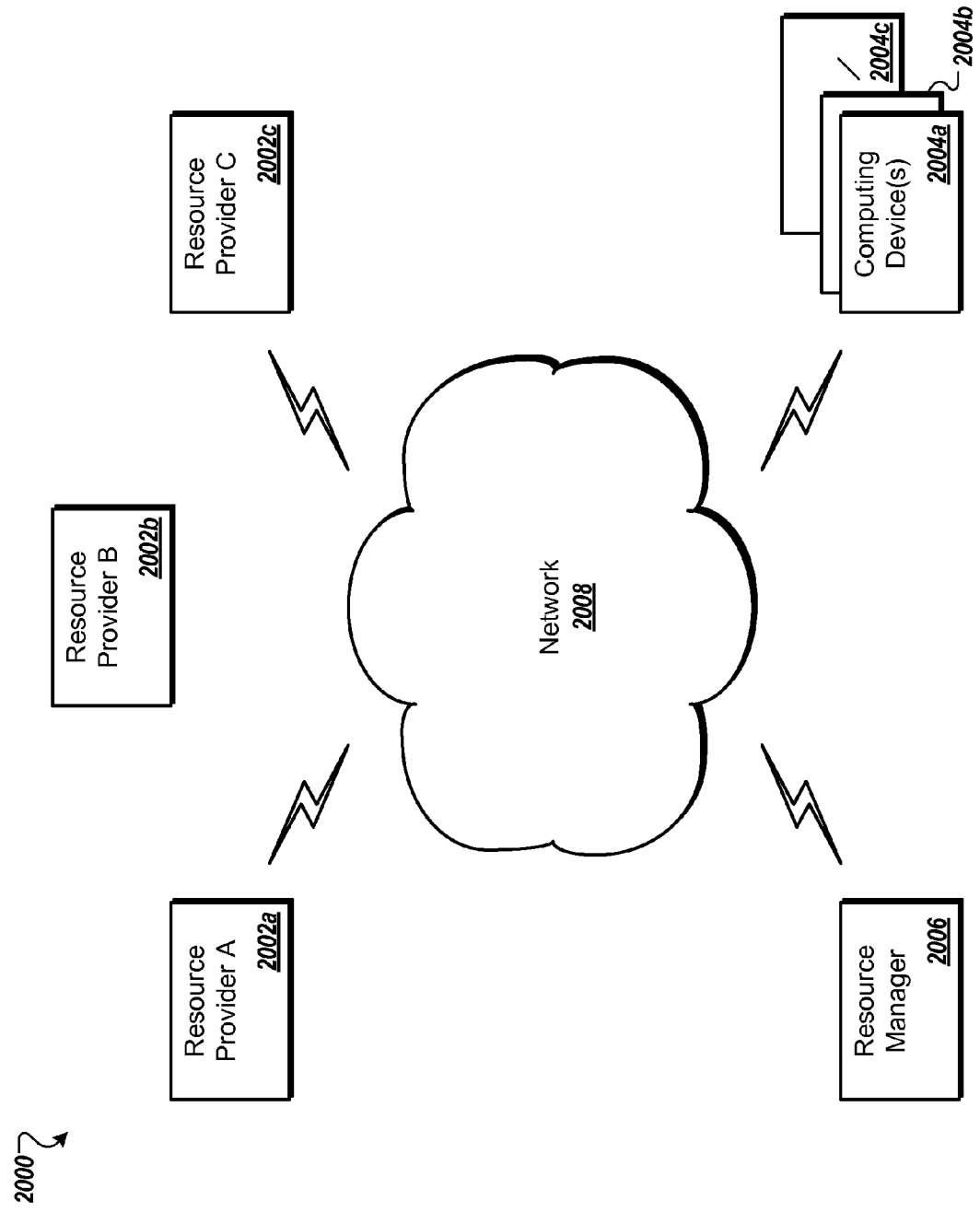
FIG. 20 is a block diagram of an example network environment for interaction with a personal electronic device via a protective device.

As shown in FIG. 20, an implementation of a network environment 2000 for interaction with a personal electronic device via a protective device is shown and described. In brief overview, Referring now to FIG. 20, a block diagram of an exemplary cloud computing environment 2000 is shown and described. The cloud computing environment 2000 may include one or more resource providers 2002a, 2002b, 2002c (collectively, 2002).

Each resource provider 2002 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 2002 may be connected to any other resource provider 2002 in the cloud computing environment 2000. In some implementations, the resource providers 2002 may be connected over a computer network 2008. Each resource provider 2002 may be connected to one or more computing device 2004a, 2004b, 2004c (collectively, 2004), over the computer network 2008.

The cloud computing environment 2000 may include a resource manager 2006. The resource manager 2006 may be connected to the resource providers 2002 and the computing devices 2004 over the computer network 2008. In some implementations, the resource manager 2006 may facilitate the provision of computing resources by one or more resource providers 2002 to one or more computing devices 2004. The resource manager 2006 may receive a request for a computing resource from a particular computing device 2004. The resource manager 2006 may identify one or more resource providers 2002 capable of providing the computing resource requested by the computing device 2004. The resource manager 2006 may select a resource provider 2002 to provide the computing resource. The resource manager 2006 may facilitate a connection between the resource provider 2002 and a particular computing device 2004. In some implementations, the resource manager 2006 may establish a connection between a particular resource provider 2002 and a particular computing device 2004. In some implementations, the resource manager 2006 may redirect a particular computing device 2004 to a particular resource provider 2002 with the requested computing resource.

Figure 21:
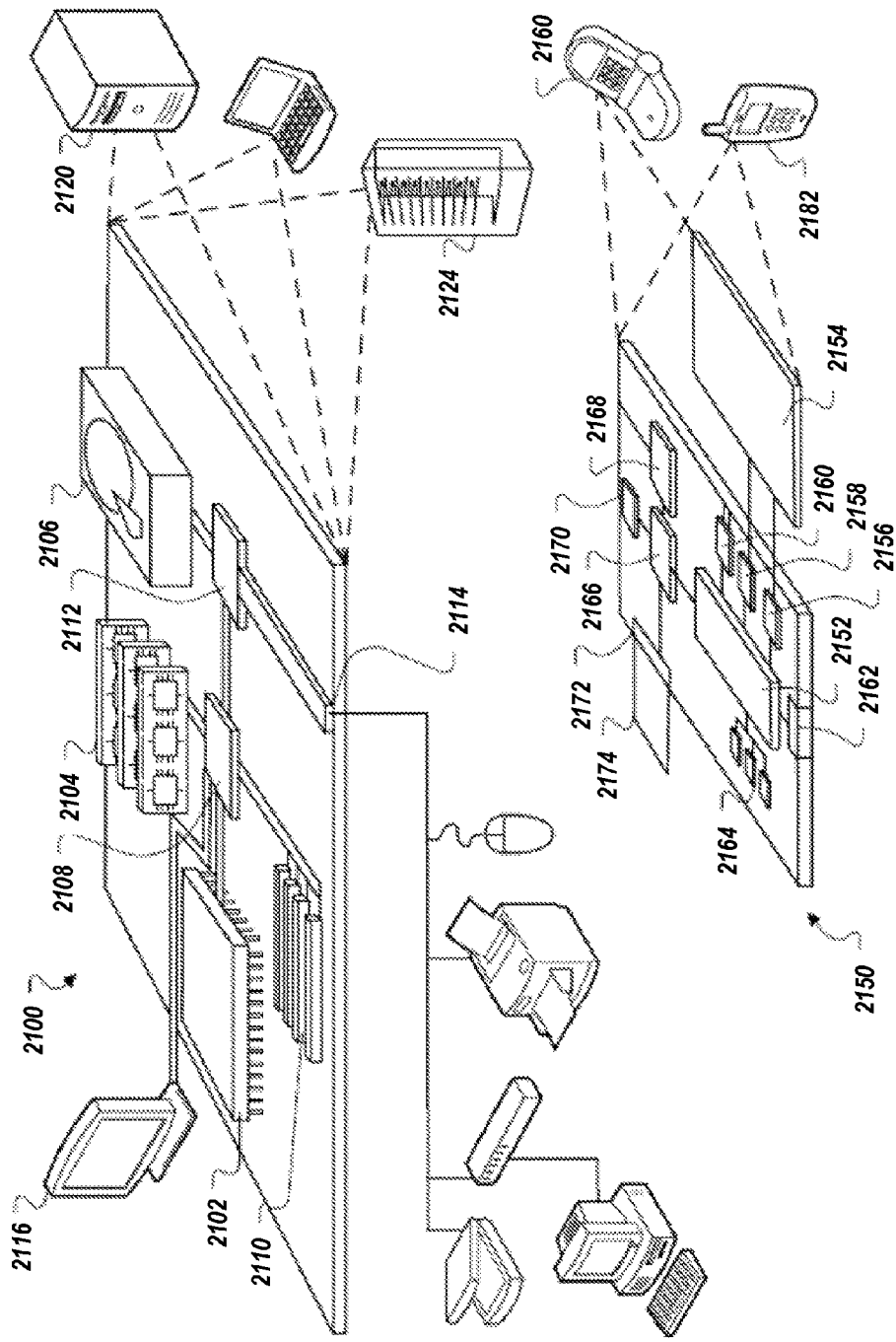
FIG. 21 is a block diagram of a computing device and a mobile computing device.

FIG. 21 shows an example of a computing device 2100 and a mobile computing device 2150 that can be used to implement the techniques described in this disclosure. The computing device 2100 is intended to represent various forms of digital computers, such as laptops, desktops, workstations, personal digital assistants, servers, blade servers, mainframes, and other appropriate computers. The mobile computing device 2150 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 2100 includes a processor 2102, a memory 2104, a storage device 2106, a high-speed interface 2108 connecting to the memory 2104 and multiple high-speed expansion ports 2110, and a low-speed interface 2112 connecting to a low-speed expansion port 2114 and the storage device 2106. Each of the processor 2102, the memory 2104, the storage device 2106, the high-speed interface 2108, the high-speed expansion ports 2110, and the low-speed interface 2112, are interconnected using various busses, and may be mounted on a common motherboard or in other manners as appropriate. The processor 2102 can process instructions for execution within the computing device 2100, including instructions stored in the memory 2104 or on the storage device 2106 to display graphical information for a GUI on an external input/output device, such as a display 2116 coupled to the high-speed interface 2108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 2104 stores information within the computing device 2100. In some implementations, the memory 2104 is a volatile memory unit or units. In some implementations, the memory 2104 is a non-volatile memory unit or units. The memory 2104 may also be another form of computer-readable medium, such as a magnetic or optical disk.

The storage device 2106 is capable of providing mass storage for the computing device 2100. In some implementations, the storage device 2106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 2102), perform one or more methods, such as those described above. The instructions can also be stored by one or more storage devices such as computer- or machine-readable mediums (for example, the memory 2104, the storage device 2106, or memory on the processor 2102).

The high-speed interface 2108 manages bandwidth-intensive operations for the computing device 2100, while the low-speed interface 2112 manages lower bandwidth-intensive operations. Such allocation of functions is an example only. In some implementations, the high-speed interface 2108 is coupled to the memory 2104, the display 2116 (e.g., through a graphics processor or accelerator), and to the high-speed expansion ports 2110, which may accept various expansion cards (not shown). In the implementation, the low-speed interface 2112 is coupled to the storage device 2106 and the low-speed expansion port 2114. The low-speed expansion port 2114, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 2100 may be implemented in a number of different forms, as shown in the figure. For example, it may be implemented as a standard server 2120, or multiple times in a group of such servers. In addition, it may be implemented in a personal computer such as a laptop computer 2122. It may also be implemented as part of a rack server system 2124. Alternatively, components from the computing device 2100 may be combined with other components in a mobile device (not shown), such as a mobile computing device 2150. Each of such devices may contain one or more of the computing device 2100 and the mobile computing device 2150, and an entire system may be made up of multiple computing devices communicating with each other.

The mobile computing device 2150 includes a processor 2152, a memory 2164, an input/output device such as a display 2154, a communication interface 2166, and a transceiver 2168, among other components. The mobile computing device 2150 may also be provided with a storage device, such as a micro-drive or other device, to provide additional storage. Each of the processor 2152, the memory 2164, the display 2154, the communication interface 2166, and the transceiver 2168, are interconnected using various buses, and several of the components may be mounted on a common motherboard or in other manners as appropriate.

The processor 2152 can execute instructions within the mobile computing device 2150, including instructions stored in the memory 2164. The processor 2152 may be implemented as a chipset of chips that include separate and multiple analog and digital processors. The processor 2152 may provide, for example, for coordination of the other components of the mobile computing device 2150, such as control of user interfaces, applications run by the mobile computing device 2150, and wireless communication by the mobile computing device 2150.

The processor 2152 may communicate with a user through a control interface 2158 and a display interface 2156 coupled to the display 2154. The display 2154 may be, for example, a TFT (Thin-Film-Transistor Liquid Crystal Display) display or an OLED (Organic Light Emitting Diode) display, or other appropriate display technology. The display interface 2156 may comprise appropriate circuitry for driving the display 2154 to present graphical and other information to a user. The control interface 2158 may receive commands from a user and convert them for submission to the processor 2152. In addition, an external interface 2162 may provide communication with the processor 2152, so as to enable near area communication of the mobile computing device 2150 with other devices. The external interface 2162 may provide, for example, for wired communication in some implementations, or for wireless communication in other implementations, and multiple interfaces may also be used.

The memory 2164 stores information within the mobile computing device 2150. The memory 2164 can be implemented as one or more of a computer-readable medium or media, a volatile memory unit or units, or a non-volatile memory unit or units. An expansion memory 2174 may also be provided and connected to the mobile computing device 2150 through an expansion interface 2172, which may include, for example, a SIMM (Single In Line Memory Module) card interface. The expansion memory 2174 may provide extra storage space for the mobile computing device 2150, or may also store applications or other information for the mobile computing device 2150. Specifically, the expansion memory 2174 may include instructions to carry out or supplement the processes described above, and may include secure information also. Thus, for example, the expansion memory 2174 may be provide as a security module for the mobile computing device 2150, and may be programmed with instructions that permit secure use of the mobile computing device 2150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 2152), perform one or more methods, such as those described above. The instructions can also be stored by one or more storage devices, such as one or more computer- or machine-readable mediums (for example, the memory 2164, the expansion memory 2174, or memory on the processor 2152). In some implementations, the instructions can be received in a propagated signal, for example, over the transceiver 2168 or the external interface 2162.

The mobile computing device 2150 may communicate wirelessly through the communication interface 2166, which may include digital signal processing circuitry where necessary. The communication interface 2166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 2168 using a radio-frequency. In addition, short-range communication may occur, such as using a Bluetooth®, Wi-Fi™, or other such transceiver (not shown). In addition, a GPS (Global Positioning System) receiver module 2170 may provide additional navigation- and location-related wireless data to the mobile computing device 2150, which may be used as appropriate by applications running on the mobile computing device 2150.

The mobile computing device 2150 may also communicate audibly using an audio codec 2160, which may receive spoken information from a user and convert it to usable digital information. The audio codec 2160 may likewise generate audible sound for a user, such as through a speaker, e.g., in a handset of the mobile computing device 2150. Such sound may include sound from voice telephone calls, may include recorded sound (e.g., voice messages, music files, etc.) and may also include sound generated by applications operating on the mobile computing device 2150.

The mobile computing device 2150 may be implemented in a number of different forms, as shown in the figure. For example, it may be implemented as a cellular telephone 2180. It may also be implemented as part of a smart-phone 2182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a protective device for enabling physical interaction with a personal electronic device and methods for interacting with a personal electronic device using a protective device are provided. Having described certain implementations of methods and apparatus for supporting interactions with a personal electronic device using a physical interaction-enabling device with a protective enclosure for the personal electronic device, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
  receiving sensor data, at one or more sensors in communication with a mobile computing device releasably secured within a device receptacle portion of a physical interaction device, the device receptacle portion being configured to (i) substantially enclose and protect the mobile computing device during physical activity and (ii) permit a user to toollessly, repeatedly remove and insert the mobile computing device from and into the device receptacle portion of the physical interaction device, wherein the mobile computing device is an off-the-shelf mobile computing device comprising a touch screen;
  determining, by a processor of the mobile computing device, motion data regarding a movement of the physical interaction device;
  estimating a behavior of a user based in part upon the motion data;
  generating a response to the behavior comprising at least one of graphic, audio, tactile, or video output; and
  providing, through a wireless communications path, the response to a second device in wireless communication with the mobile computing device.

2. The method of claim 1, wherein the second device comprises a display.

3. The method of claim 1, wherein the physical interaction device comprises an external portion comprising a material selected from one or more of open cell foam, closed cell foam, foamed resin, and an inflatable bladder.

4. The method of claim 1, wherein the physical interaction device substantially obscures the mobile computing device.

5. The method of claim 1, wherein the device receptacle portion comprises one or more convex areas configured to enhance air flow around a portion of the mobile computing device.

6. The method of claim 5, wherein the one or more convex areas comprise a deformable material configured to exert pressure upon the mobile device to secure the mobile device within the device receptacle portion.

7. A method comprising:
   positioning, within a device receptacle portion of a physical interaction device, a mobile computing device electronic device, wherein:
      the device receptacle portion is configured to (i) substantially enclose and protect a mobile computing device during physical activity and (ii) permit a user to toollessly, repeatedly remove and insert the mobile computing device from and into the device receptacle portion of the physical interaction device, and
      the mobile computing device is an off-the-shelf mobile computing device comprising a touch screen; and
   initiating execution of instructions associated with a software application on the mobile electronic device within the physical interaction device, wherein the instructions, when executed, cause a processor of the mobile electronic device to
      determine, via a set of sensor data collected from one or more sensors in communication with the mobile electronic device, movement data,
      correlate the movement data with an anticipated activity of a user interacting with the physical interaction device, and
      provide feedback to the user in the form of at least one of graphic, video, and audio output responsive to the anticipated activity.

8. The method of claim 7, further comprising configuring a set of parameters associated with the software application.

9. The method of claim 8, wherein configuring the set of parameters comprises identifying a type of the physical interaction device.

10. The method of claim 8, wherein configuring the set of parameters comprises uniquely identifying the physical interaction device.

11. The method of claim 8, wherein configuring the set of parameters comprises uniquely identifying the user.

12. The method of claim 7, wherein the physical interaction device comprises at least one of the one or more sensors.

13. The method of claim 7, wherein providing feedback comprises communicating at least one of graphic, video and audio output to an external output device.

14. A system comprising:
   a physical interaction device having an internal cavity configured to releasably secure a handheld computing device, wherein:
      the device receptacle portion is configured to (i) substantially enclose and protect the handheld computing device during physical activity and (ii) permit a user to toollessly, repeatedly remove and insert the handheld computing device from and into the device receptacle portion of the physical interaction device,
      the handheld computing device is an off-the-shelf handheld computing device comprising a touch screen, and
      a processor of the handheld computing device is configured to execute instructions that cause the processor to perform the steps of:
         determining an identification associated with a user of the physical interaction device,
         collecting sensor data associated with interactions between the user and the physical interaction device,
         determining at least one activity parameter of an activity enabled by the physical interaction device, the activity parameter based in part on the sensor data, and
         storing data associated with both the identification and the activity parameter to a storage media.

15. The system of claim 14, wherein the storage media is accessible to the handheld computing device via a wireless network in communication with the handheld computing device.

16. The system of claim 15, wherein the data is collected and made accessible to a second device as historic data.

17. The system of claim 15, wherein the data is accessible to a second device during execution of the instructions.

18. The system of claim 14, wherein the physical interaction device comprises at least one of weight training exercise equipment, combat-training exercise equipment, balance and coordination training exercise equipment, or sports game equipment.

19. The system of claim 14, wherein the physical interaction device comprises an imaginative play toy.

20. The system of claim 14, wherein the steps further comprise providing feedback to the user based in part on the activity parameter, wherein the feedback comprises at least one of audio, graphical, video, and tactile output.

* * * * *